United States Patent
Merriman et al.

(10) Patent No.: US 10,084,217 B2
(45) Date of Patent: Sep. 25, 2018

(54) BATTERY SYSTEM

(71) Applicant: LG Chem, Ltd., Seoul (KR)

(72) Inventors: Robert Merriman, Shelby Township, MI (US); Scott Dudley, Commerce Township, MI (US); Heekook Yang, Troy, MI (US)

(73) Assignee: LG Chem, Ltd., Seoul (KR)

( * ) Notice: Subject to any disclaimer, the term of this patent is extended or adjusted under 35 U.S.C. 154(b) by 369 days.

(21) Appl. No.: 15/044,296

(22) Filed: Feb. 16, 2016

(65) Prior Publication Data

US 2017/0237132 A1    Aug. 17, 2017

(51) Int. Cl.
| | |
|---|---|
| *H01M 10/00* | (2006.01) |
| *H01M 10/6555* | (2014.01) |
| *H01M 10/613* | (2014.01) |
| *H01M 10/647* | (2014.01) |
| *H01M 10/653* | (2014.01) |
| *H01M 2/02* | (2006.01) |

(52) U.S. Cl.
CPC ....... *H01M 10/6555* (2015.04); *H01M 2/024* (2013.01); *H01M 2/0207* (2013.01); *H01M 10/613* (2015.04); *H01M 10/647* (2015.04); *H01M 10/653* (2015.04)

(58) Field of Classification Search
CPC .......... H01M 10/6555; H01M 10/613; H01M 140/6745; H01M 10/653; H01M 2/0207; H01M 2/024; H01M 10/647
See application file for complete search history.

(56) References Cited

U.S. PATENT DOCUMENTS

| | | | |
|---|---|---|---|
| 8,574,740 B2 | 11/2013 | Quick et al. | |
| 8,927,131 B2 | 1/2015 | Wang | |
| 8,968,906 B2 | 3/2015 | Hsu et al. | |

(Continued)

FOREIGN PATENT DOCUMENTS

| | | |
|---|---|---|
| JP | 2014127321 A | 7/2014 |
| KR | 1020110080537 | 7/2011 |

(Continued)

OTHER PUBLICATIONS

International Search Report on PCT/KR2017001606 dated May 19, 2017.

*Primary Examiner* — Cynthia H Kelly
*Assistant Examiner* — Monique M Wills
(74) *Attorney, Agent, or Firm* — Buckert Patent & Trademark Law Firm PC; John F. Buckert

(57) ABSTRACT

A battery system having a thermally conductive base member, a thermal interface member, and a battery module is provided. The thermal interface member is disposed on the thermally conductive base member and has first and second arcuate-shaped surfaces and a first groove. The battery module has a first pouch-type battery cell with a first outer housing having a first end portion with a first extension portion and first and second arcuate-shaped end surfaces. The first pouch-type battery cell is disposed directly on the thermal interface member such that the first extension portion is disposed in the first groove of the thermal interface member, and the first and second arcuate-shaped end surfaces are disposed directly on and against the first and second arcuate-shaped surfaces, respectively, of the thermal interface member.

20 Claims, 14 Drawing Sheets

(56) References Cited

U.S. PATENT DOCUMENTS

| | | |
|---|---|---|
| 9,065,158 B2 | 6/2015 | Martz et al. |
| 2011/0192564 A1 | 8/2011 | Mommer et al. |
| 2012/0171532 A1 | 7/2012 | Lee et al. |
| 2014/0234691 A1 | 8/2014 | Lee et al. |
| 2015/0287963 A1* | 10/2015 | Chiba ................. H01M 2/1016 429/87 |
| 2016/0233465 A1 | 8/2016 | Lee et al. |

FOREIGN PATENT DOCUMENTS

| | | |
|---|---|---|
| KR | 1020120104592 | 9/2012 |
| KR | 1020130086678 | 8/2013 |
| KR | 1020160016497 | 2/2016 |

* cited by examiner

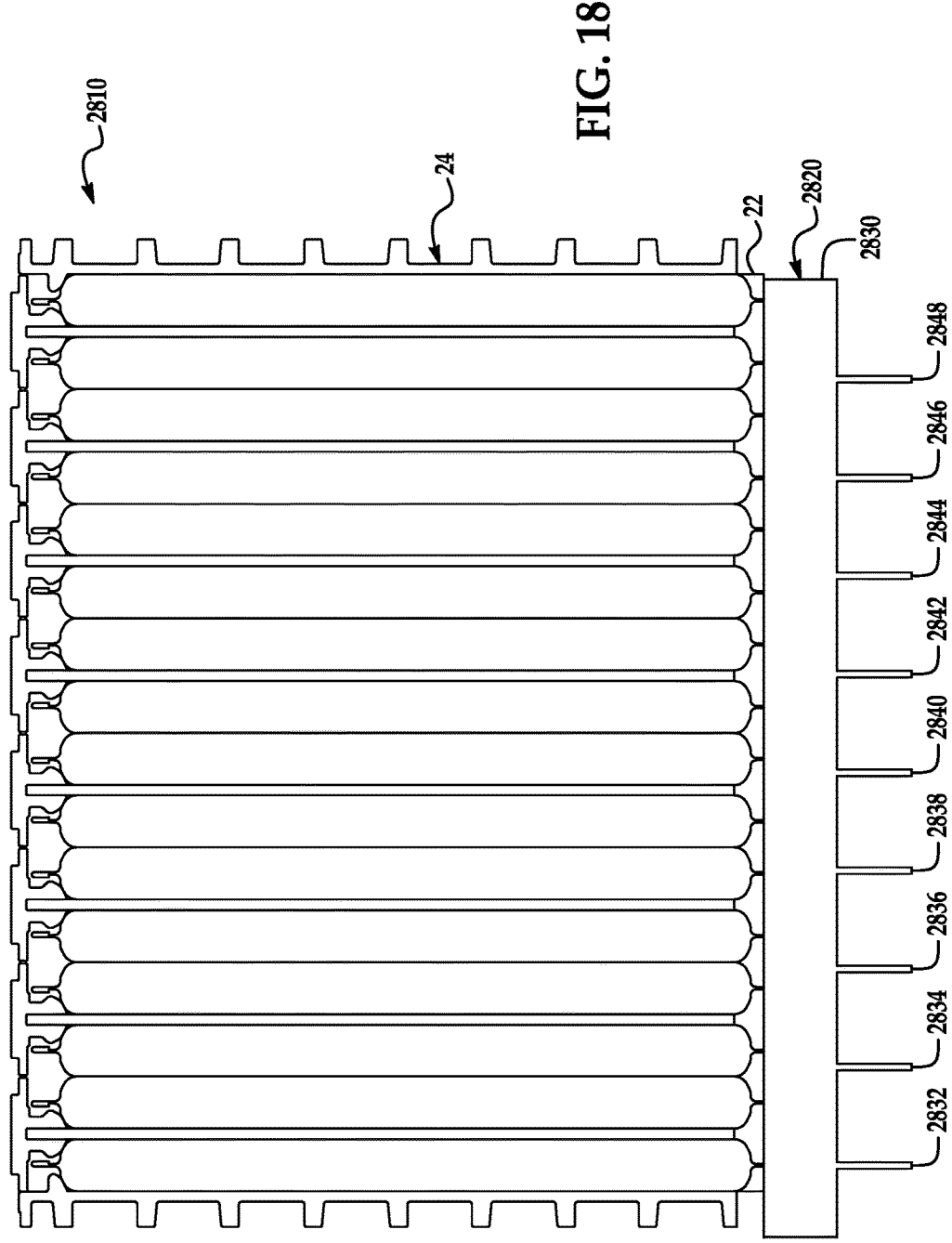

BATTERY SYSTEM

BACKGROUND

The inventors herein have recognized a need for an improved battery system that utilizes a thermal interface member that directly contacts end portions of pouch type battery cells of a battery module to transfer heat energy from the pouch-type battery cells to a thermally conductive base member, without utilizing internal cooling fins disposed between the pouch-type battery cells.

SUMMARY

A battery system in accordance with an exemplary embodiment is provided. The battery system includes a thermally conductive base member. The battery system further includes a thermal interface member disposed on a surface of the thermally conductive base member. The thermal interface member has first and second arcuate-shaped surfaces and a first groove. The first groove is disposed between the first and second arcuate-shaped surfaces and extends into the thermal interface member. The battery system further includes a battery module having a first pouch-type battery cell. The first pouch-type battery cell has a first outer housing with a first end portion and a second end portion. The first end portion of the first outer housing has a first extension portion and first and second arcuate-shaped end surfaces. The first extension portion of the first outer housing has a first end and a second end. The first arcuate-shaped end surface of the first outer housing extends from the first end of the first extension portion of the first outer housing. The second arcuate-shaped end surface of the first outer housing extends from the first end of the first extension portion of the first outer housing and away from the first arcuate-shaped end surface of the first outer housing. The first pouch-type battery cell is disposed directly on the thermal interface member such that the first extension portion of the first pouch-type battery cell is disposed in the first groove of the thermal interface member, and the first extension portion of the first outer housing directly contacts the thermal interface member, and the first and second arcuate-shaped end surfaces of the first pouch-type battery cell are disposed directly on and against the first and second arcuate-shaped surfaces, respectively, of the thermal interface member.

BRIEF DESCRIPTION OF THE DRAWINGS

FIG. 18 is a cross-sectional schematic of the battery system of FIG. 17 taken along lines 18-18 in FIG. 17.

DETAILED DESCRIPTION

Referring to FIGS. 1-5, a battery system 10 in accordance with an exemplary embodiment is provided. The battery system 10 includes a thermally conductive base member 20, a thermal interface member 22, and a battery module 24. An advantage of the battery system 10 is that the battery system 10 utilizes a thermal interface member 22 that is disposed directly against end portions of pouch-type battery cell of the battery module 24, which transfers heat energy from the pouch-type battery cells to the thermally conductive base member 20, without having to use cooling fins disposed between the pouch-type battery cells.

Figure 2:
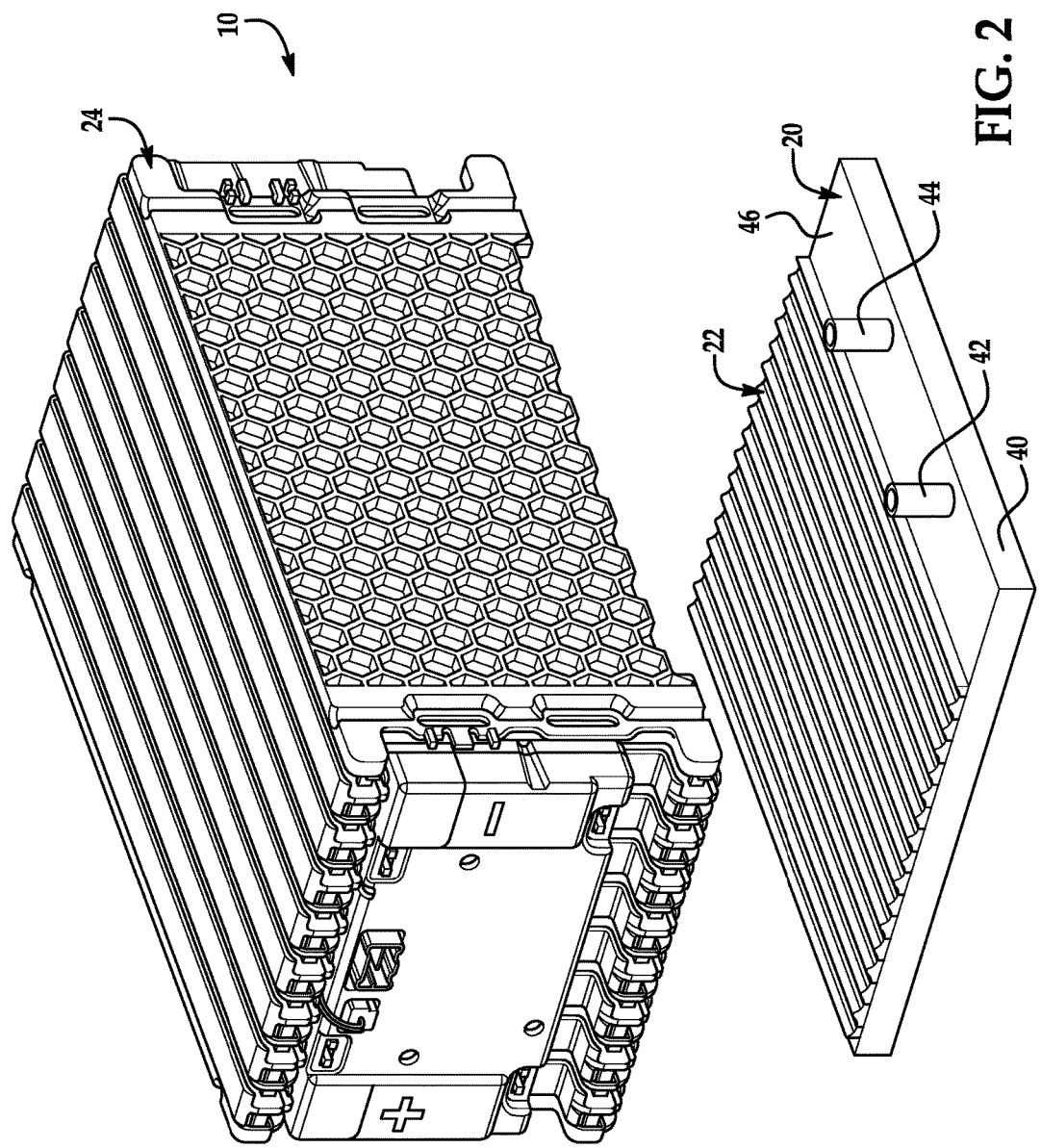
FIG. 2 is a partially exploded schematic of the battery system of FIG. 1 having a thermally conductive base member, a thermal interface member, and a battery module.
Figure 3:
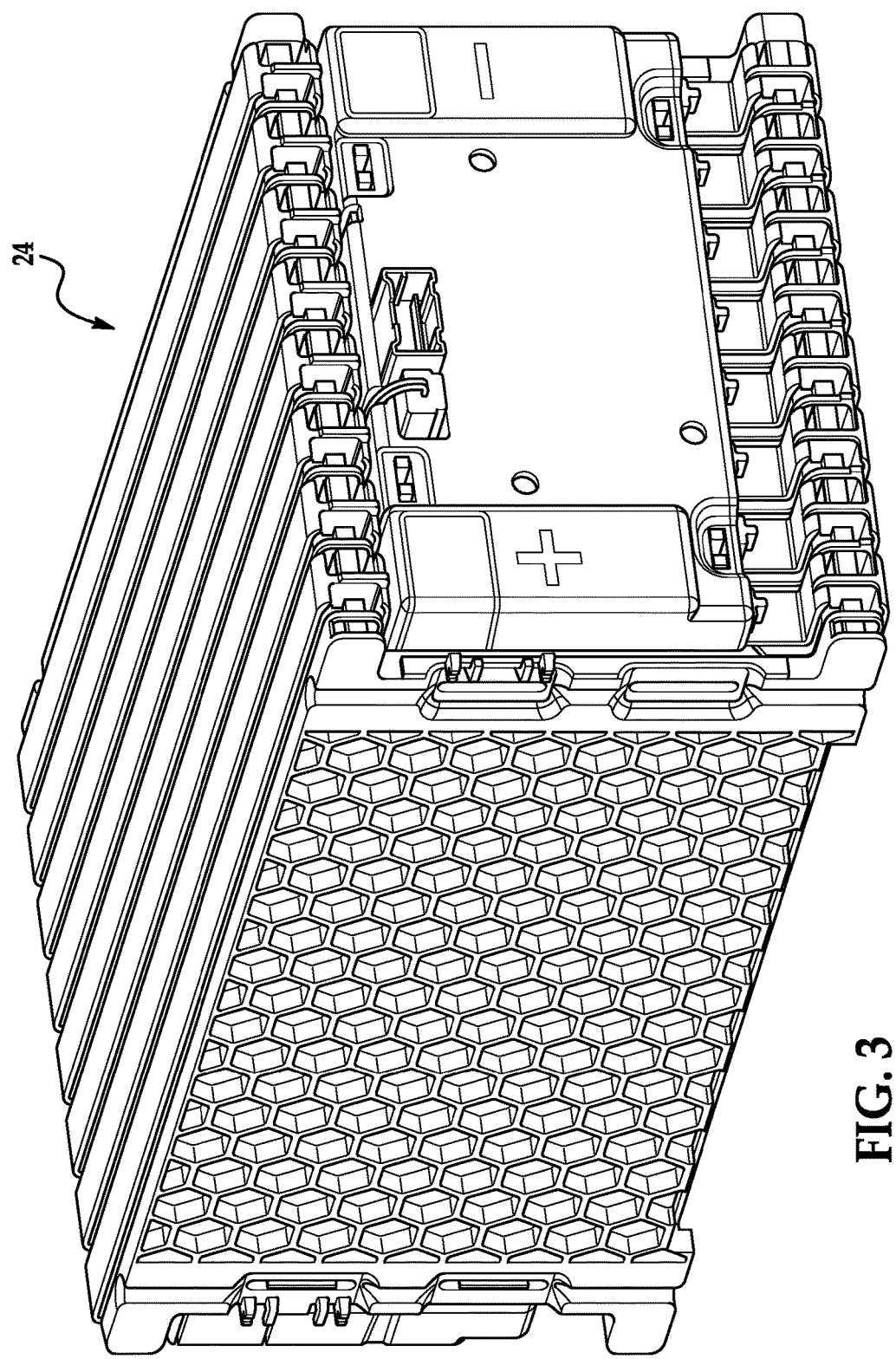
FIG. 3 is a schematic of the battery module of FIG. 2.
Figure 4:
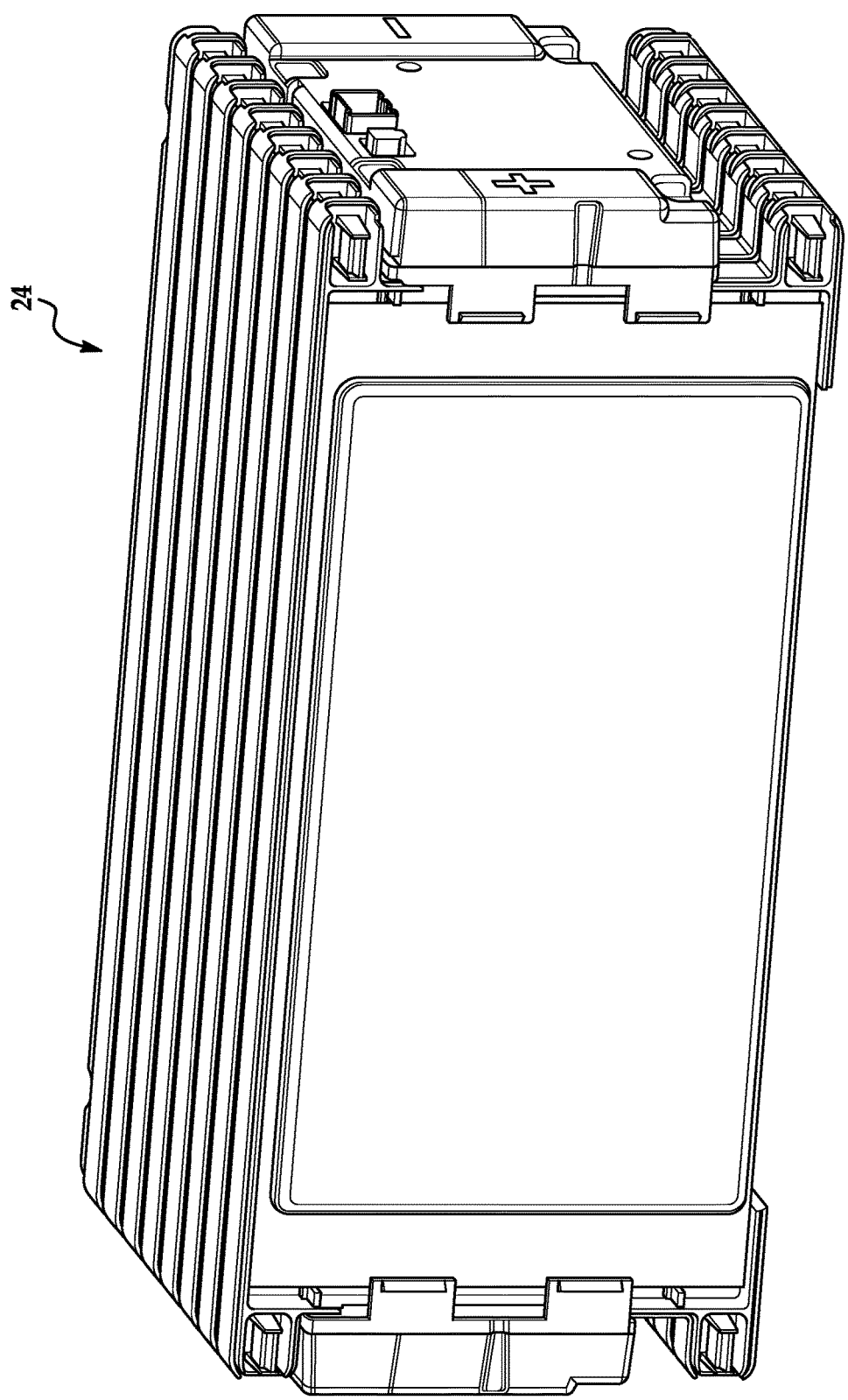
FIG. 4 is a schematic of a portion of the battery module of FIG. 2.
Figure 5:
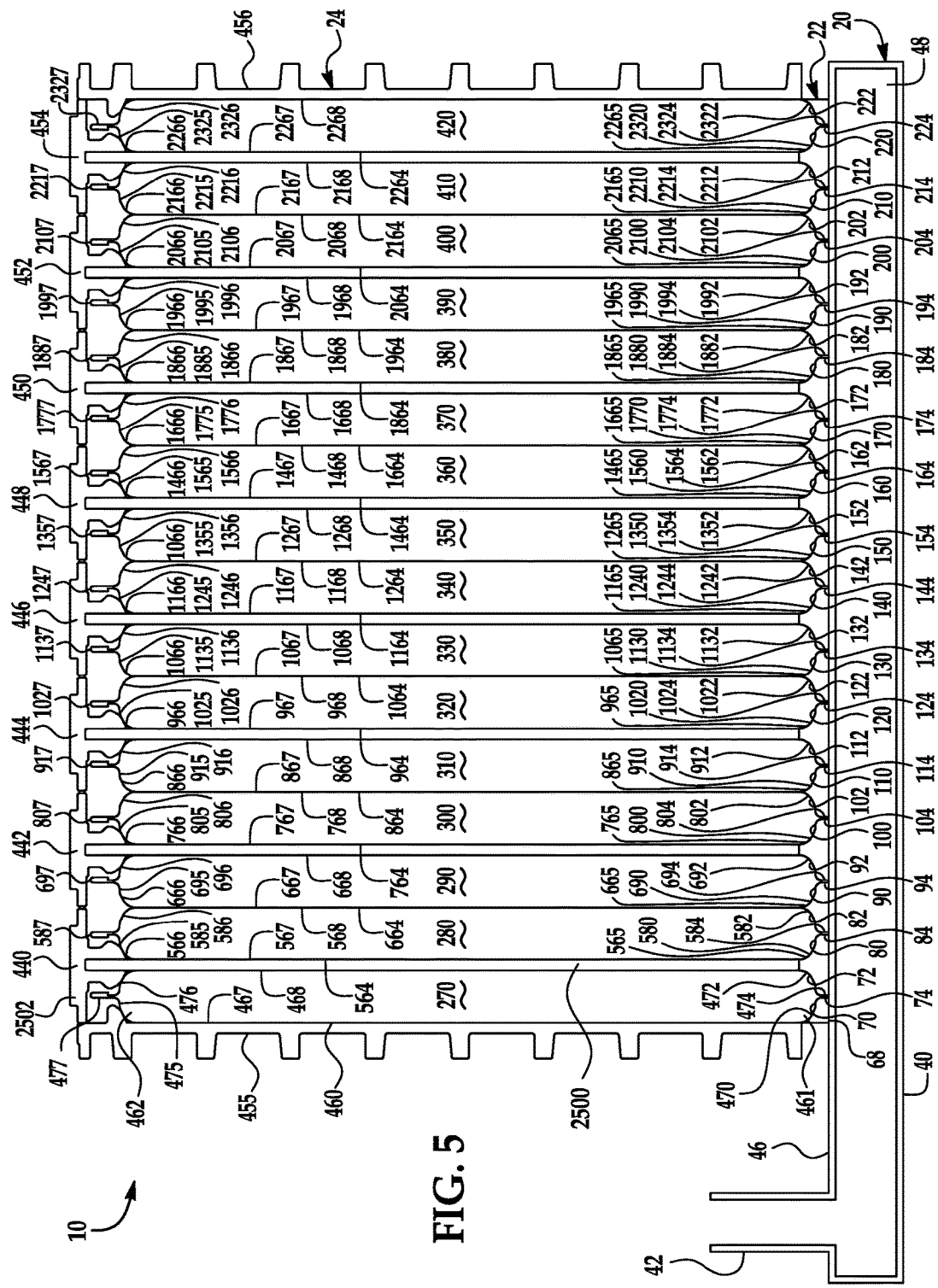
FIG. 5 is a cross-sectional schematic of the battery system of FIG. 1 taken along lines 5-5 in FIG. 1.

Referring to FIGS. 2 and 5, the thermally conductive base member 20 is provided to conduct heat energy from the thermal interface member 22 to a fluid flowing through the thermally conductive base member 20. The thermally conductive base member 20 includes an outer housing 40, an inlet member 42, and an outlet member 44. The outer housing 40 has a flat upper surface 46 which directly supports the thermal interface member 22 thereon. The outer housing 40 has an interior region 48 therein. The inlet member 42 and the outlet member 44 are coupled to the outer housing 40 and fluidly communicate with the interior region 48. A fluid supply system (not shown) pumps fluid through the inlet member 42 and the interior region 48 and then through the outlet member 44 for extracting heat energy from the thermally conductive base member 20 and the thermal interface member 22. In an exemplary embodiment, the outer housing 40, the inlet member 42, and the outlet member 44 are constructed of metal. Of course, in an alternative embodiment, the outer housing 40, the inlet member 42, and the outlet member 44 could be constructed of other thermally conductive materials.

Figure 6:
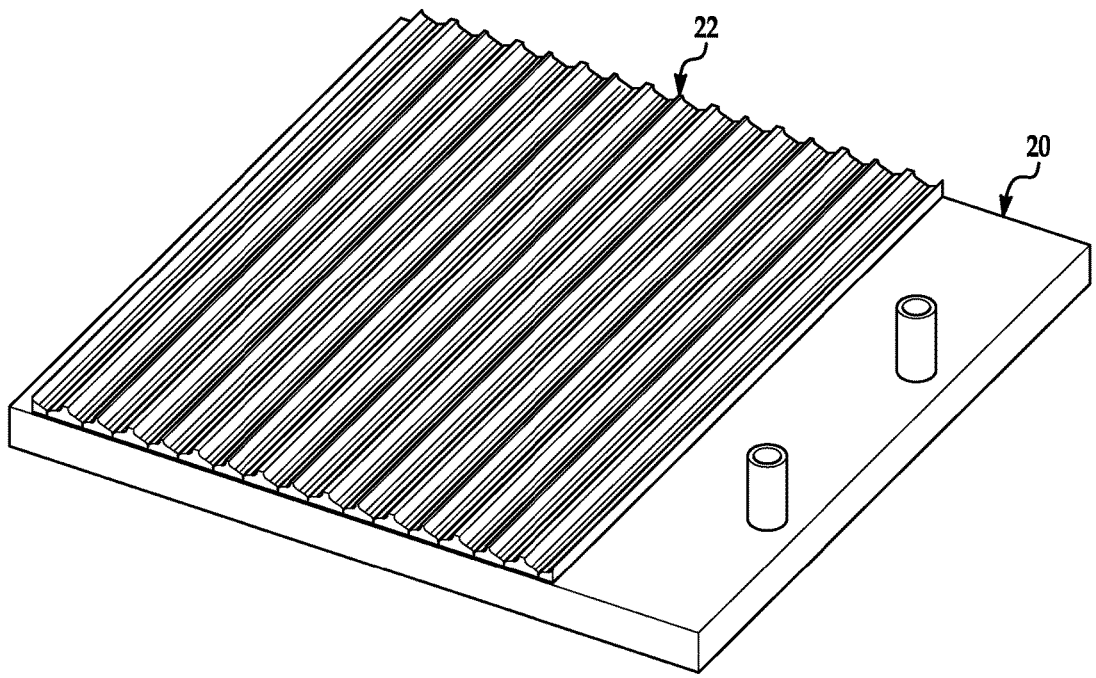
FIG. 6 is a schematic of the thermally conductive base member and the thermal interface member of FIG. 2.
Figure 7:
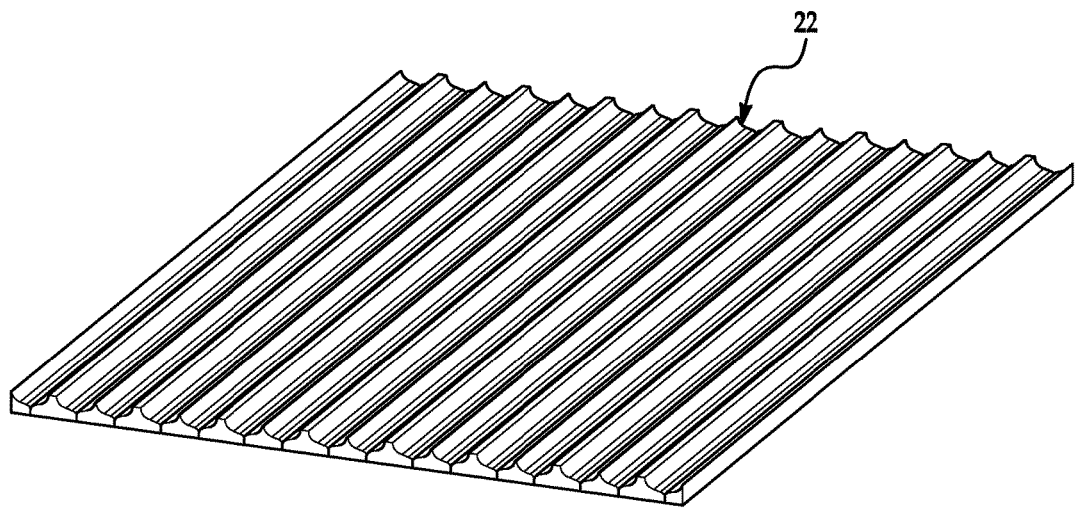
FIG. 7 is a schematic of the thermal interface member of FIG. 6.
Figure 8:
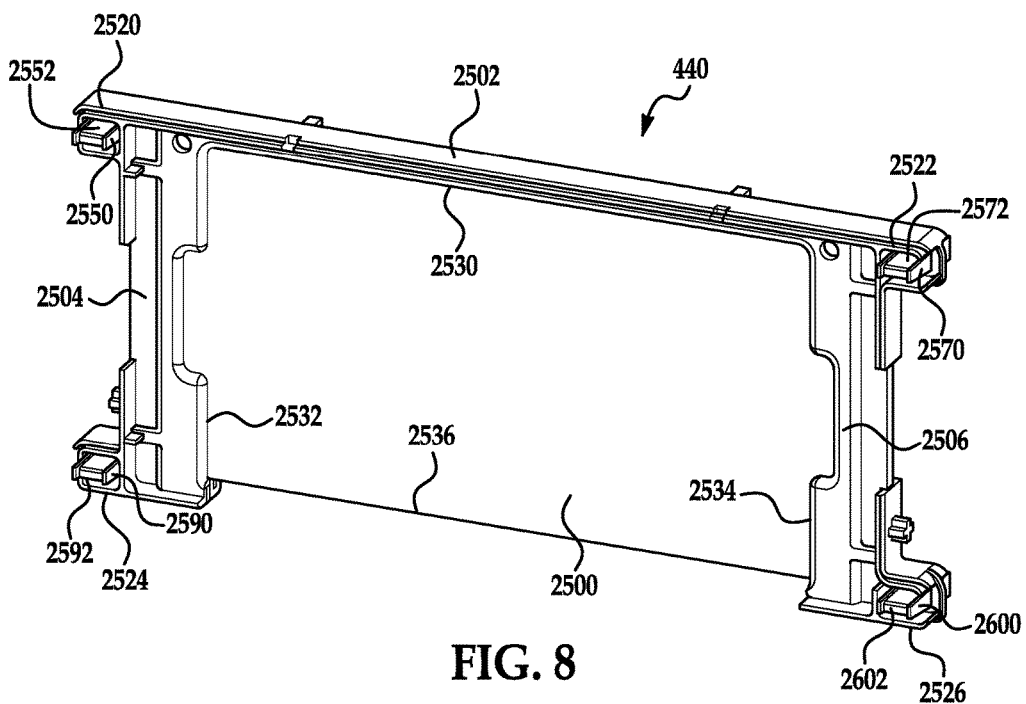
FIG. 8 is a schematic of a frame member utilized in the battery module of FIG. 3.
Figure 9:
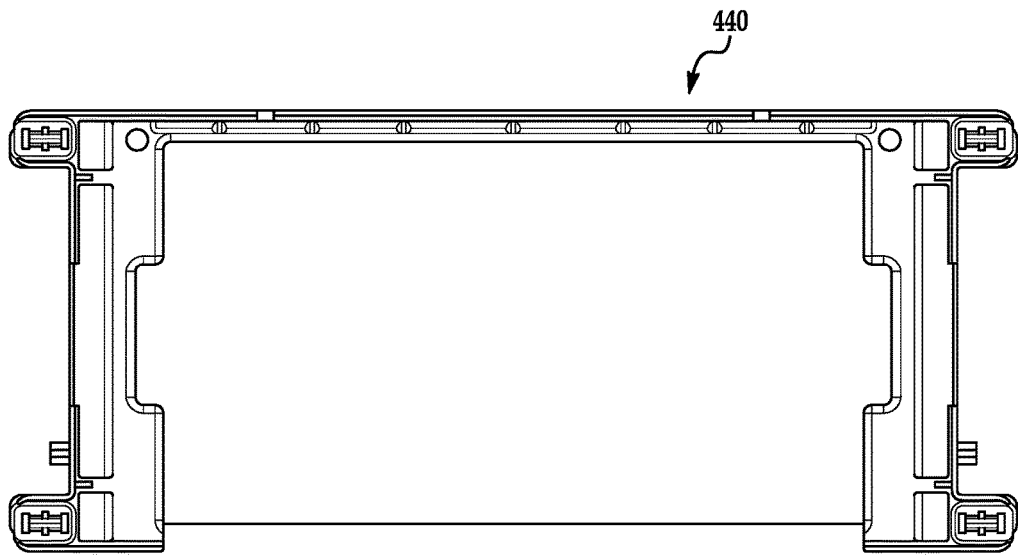
FIG. 9 is a schematic of a first side of the frame member of FIG. 8.
Figure 10:
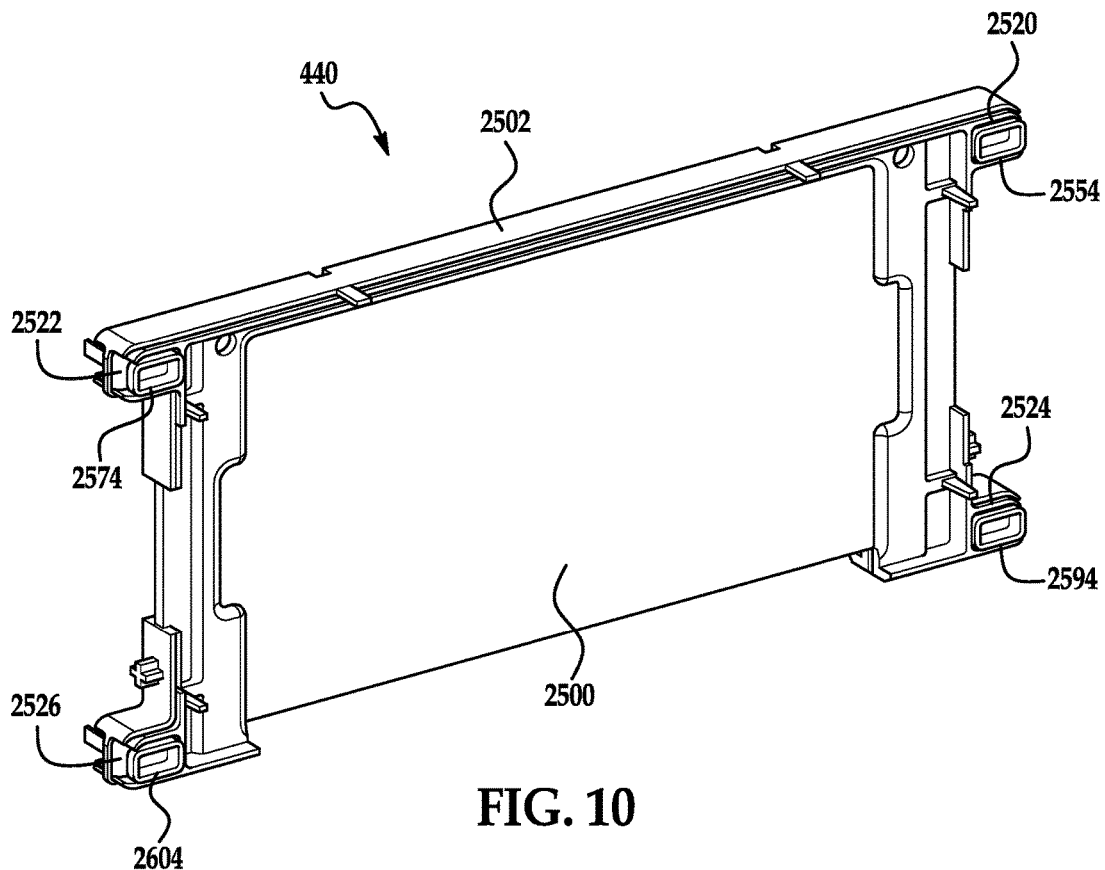
FIG. 10 is another schematic of the frame member of FIG. 8.
Figure 11:
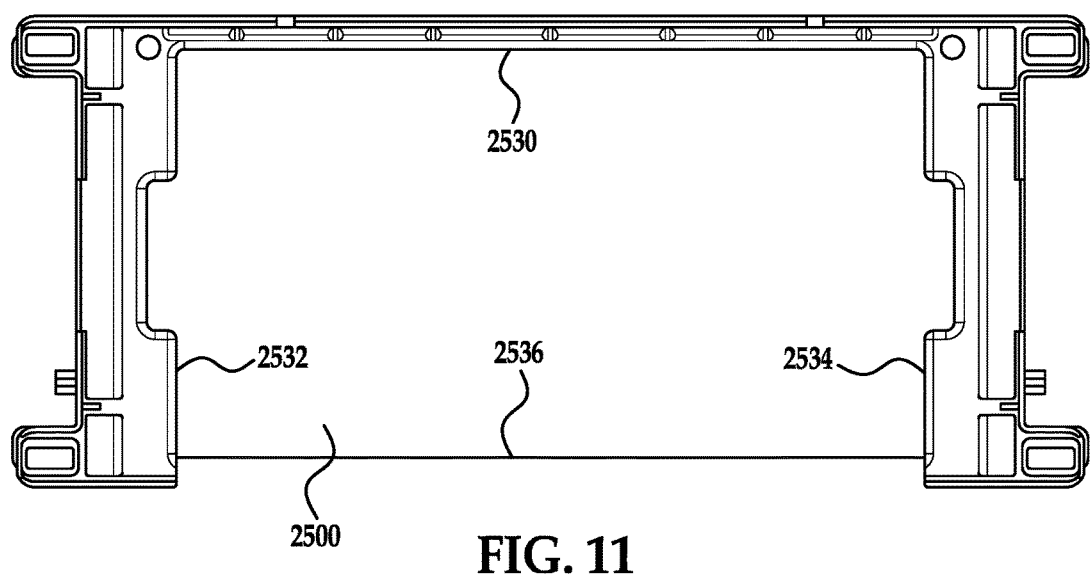
FIG. 11 is a schematic of a second side of the frame member of FIG. 8.
Figure 12:
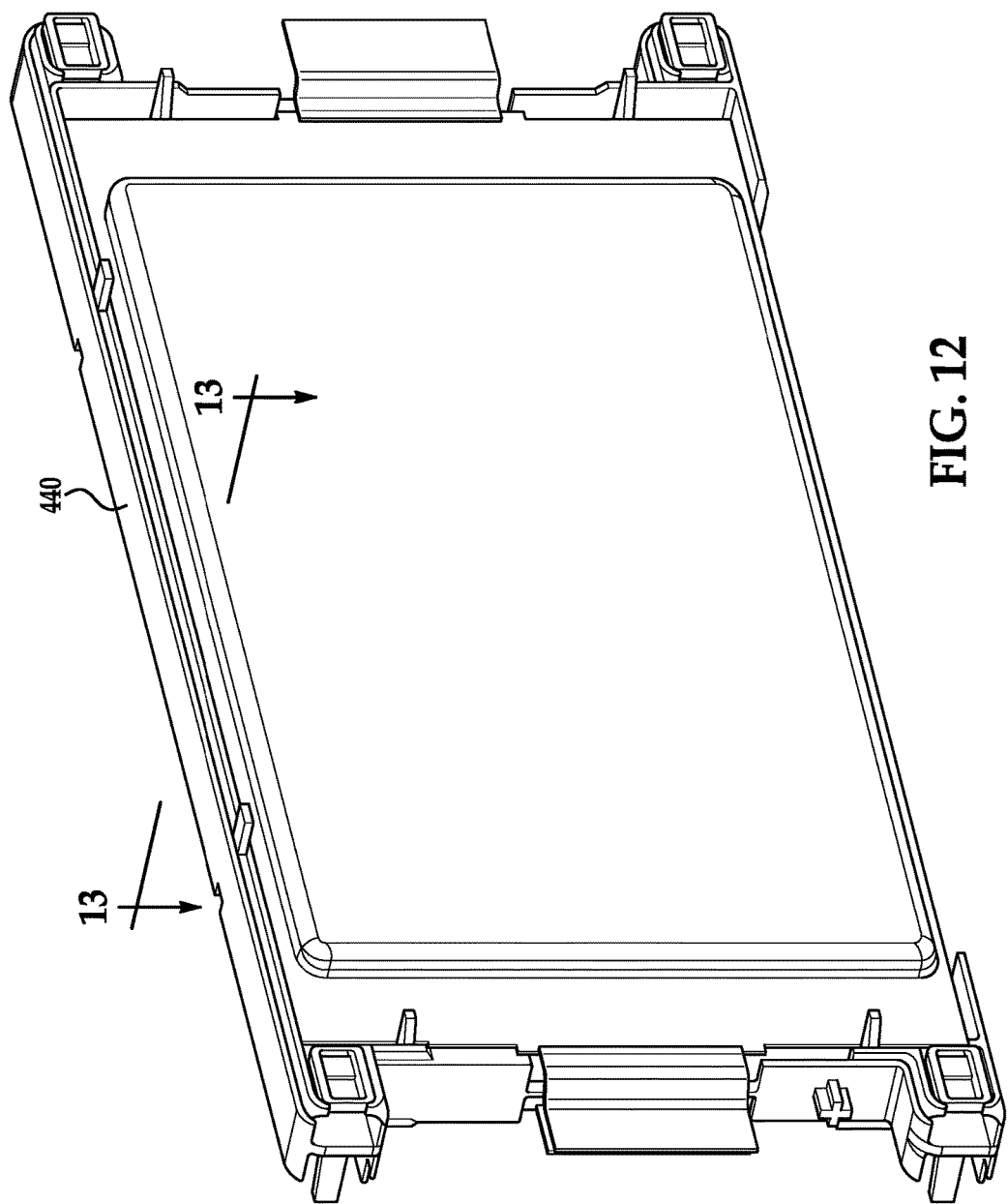
FIG. 12 is a schematic of a frame member and first and second pouch-type battery cells utilized in the battery module of FIG. 3.

Referring to FIGS. 5-7, the thermal interface member 22 is provided to directly contact pouch-type battery cells in the battery module 24 to conduct heat energy from the pouch-type battery cells to the thermally conductive base member 20. The thermal interface member 22 is disposed on the flat upper surface 46 of the thermally conductive base member 20. In an exemplary embodiment, the thermal interface member 22 is a pre-formed thermally conductive foam. Further, the pre-formed thermally conductive foam is a molded thermally conductive polyurethane open-cell foam. Further, in an exemplary embodiment, the thermal interface member 22 has a thermal conductivity in a range of 1.5-3.0

Watts per meter-Kelvin. In an alternative embodiment, the thermal interface member 22 is a constructed of a metal such as aluminum for example.

The thermal interface member 22 has a bottom surface 68, arcuate-shaped surfaces 70, 72, 80, 82, 90, 92, 100, 102, 110, 112, 120, 122, 130, 132, 140, 142, 150, 152, 160, 162, 170, 172, 180, 182, 190, 192, 200, 202, 210, 212, 220, 222, and grooves 74, 84, 94, 104, 114, 124, 134, 144, 154, 164, 174, 184, 194, 204, 214, 224. The groove 74 is disposed between the arcuate-shaped surfaces 70, 72 and extends into the thermal interface member 22. The groove 84 is disposed between the arcuate-shaped surfaces 80, 82 and extends into the thermal interface member 22. The groove 94 is disposed between the arcuate-shaped surfaces 90, 92 and extends into the thermal interface member 22. The groove 104 is disposed between the arcuate-shaped surfaces 100, 102 and extends into the thermal interface member 22. The groove 114 is disposed between the arcuate-shaped surfaces 110, 112 and extends into the thermal interface member 22. The groove 124 is disposed between the arcuate-shaped surfaces 120, 122 and extends into the thermal interface member 22. The groove 134 is disposed between the arcuate-shaped surfaces 130, 132 and extends into the thermal interface member 22. The groove 144 is disposed between the arcuate-shaped surfaces 140, 142 and extends into the thermal interface member 22. The groove 154 is disposed between the arcuate-shaped surfaces 150, 152 and extends into the thermal interface member 22. The groove 164 is disposed between the arcuate-shaped surfaces 160, 162 and extends into the thermal interface member 22. The groove 174 is disposed between the arcuate-shaped surfaces 170, 172 and extends into the thermal interface member 22. The groove 184 is disposed between the arcuate-shaped surfaces 180, 182 and extends into the thermal interface member 22. The groove 194 is disposed between the arcuate-shaped surfaces 190, 192 and extends into the thermal interface member 22. The groove 204 is disposed between the arcuate-shaped surfaces 200, 202 and extends into the thermal interface member 22. The groove 214 is disposed between the arcuate-shaped surfaces 210, 212 and extends into the thermal interface member 22. The groove 224 is disposed between the arcuate-shaped surfaces 220, 222 and extends into the thermal interface member 22.

Referring to FIG. 5, the battery module 24 includes pouch-type battery cells 270, 280, 290, 300, 310, 320, 330, 340, 350, 360, 370, 380, 390, 400, 410, 420, frame members 440, 442, 444, 446, 448, 450, 452, 454 and end plates 455, 456. In an exemplary embodiment, the pouch-type battery cells 270-420 are each lithium-ion pouch-type battery cells and have identical structure to one another.

Figure 13:
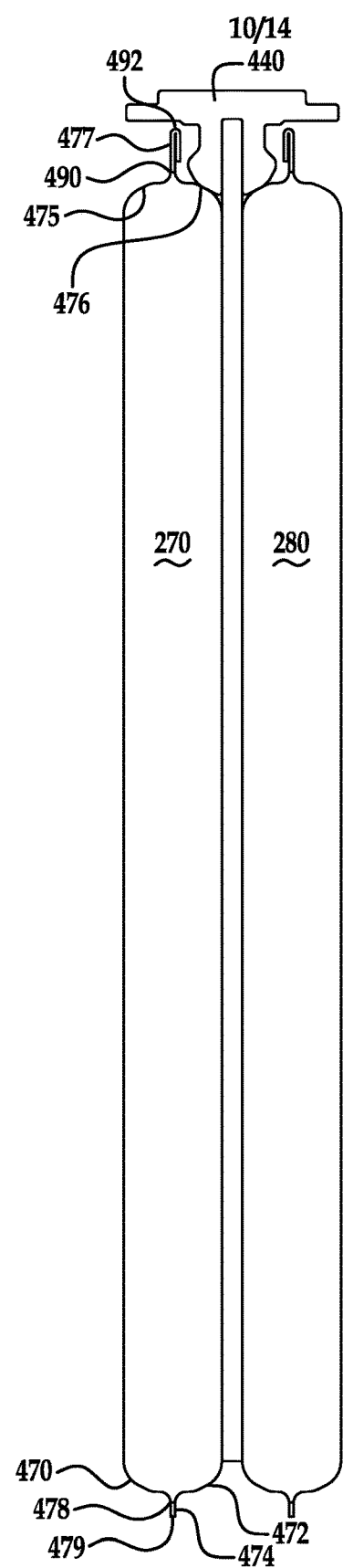
FIG. 13 is a cross-sectional schematic of the frame member and the first and second pouch-type battery cells of FIG. 12 taken along lines 13-13 in FIG. 12.
Figure 14:
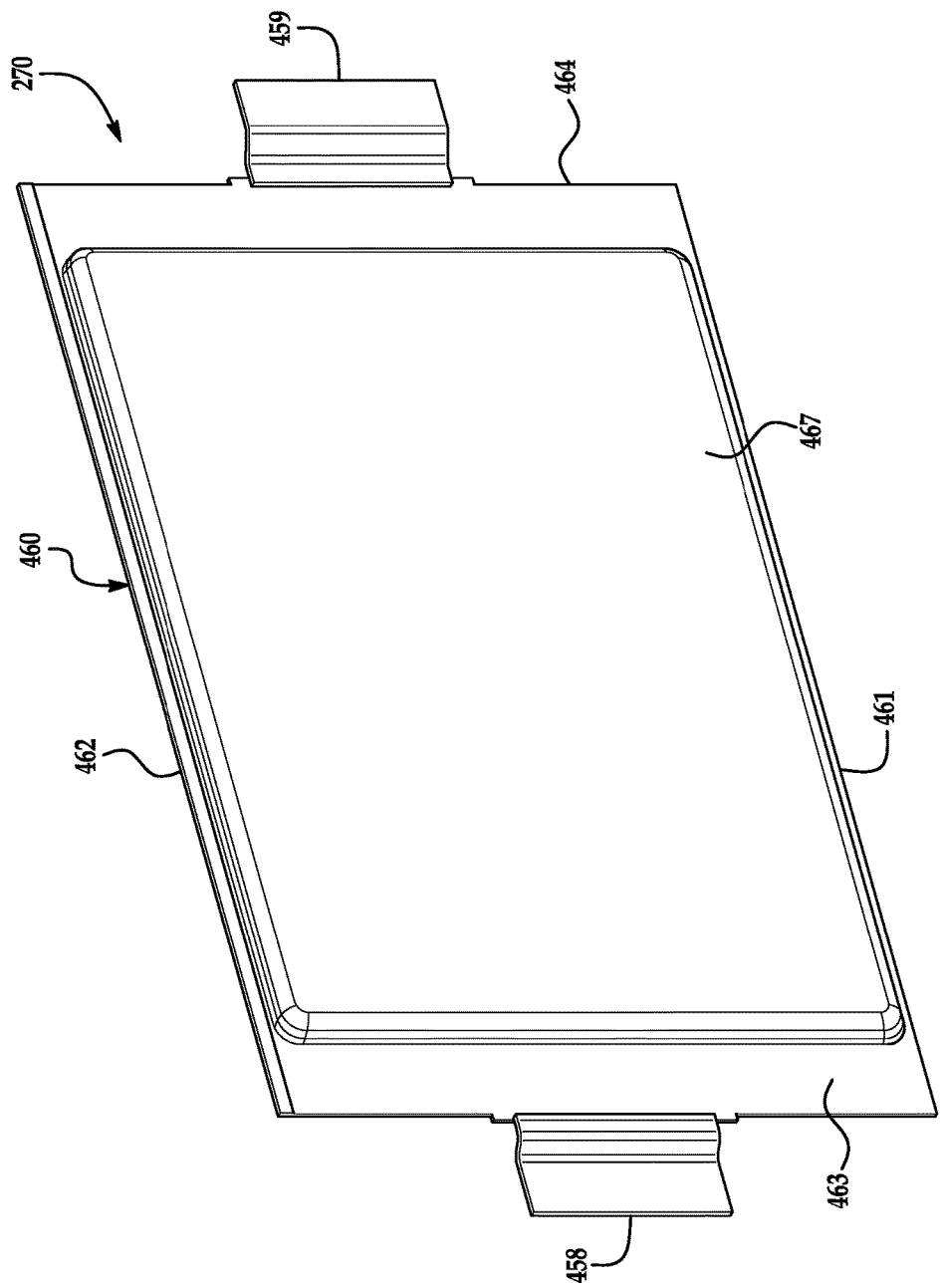
FIG. 14 is a schematic of the first pouch-type battery cell of FIG. 12.

Referring to FIGS. 5, 13 and 14, the pouch-type battery cell 270 includes electrical terminals 458, 459 and an outer housing 460. The outer housing 460 includes a first end portion 461, a second end portion 462, a third end portion 463, and a fourth end portion 464, and major surfaces 467, 468. The first and second end portions 461, 462 extend substantially parallel to one another. The third and fourth end portions 463, 464 extend substantially parallel to one another, and substantially perpendicular to the first and second end portions 461, 462. The major surface 467 is disposed between the first end portion 461, the second end portion 462, the third end portion 463, and the fourth end portion 464. Further, the major surface 468 extends substantially parallel to the major surface 467 and is disposed between the first end portion 461, the second end portion 462, the third end portion 463, and the fourth end portion 464. The electrical terminal 458 extends outwardly from the third end portion 463, and the electrical terminal 459 extends outwardly for the fourth end portion 464.

The first end portion 461 has an extension portion 474 and arcuate-shaped end surfaces 470, 472. The extension portion 474 has a first end 478 (shown in FIG. 13) and a second end 479. The arcuate-shaped end surface 470 extends from the first end 478 of the extension portion 474. Also, the arcuate-shaped end surface 472 extends from the first end 478 of the extension portion 474 and away from the arcuate-shaped end surface 470. A length of the extension portion 474 is in a range of 1.0-5.0 millimeters.

The second end portion 462 has an extension portion 477 and arcuate-shaped end surfaces 475, 476. The extension portion 477 has a first end 490 and a second end 492. The arcuate-shaped end surface 475 extends from the first end 490 of the extension portion 477. Also, the arcuate-shaped end surface 476 extends from the first end 490 of the extension portion 477 and away from the arcuate-shaped end surface 475. A length of the extension portion 477 is greater than a length of the extension portion 474.

The pouch-type battery cell 270 is disposed directly on the thermal interface member 22 such that the extension portion 474 is disposed in the groove 74 of the thermal interface member 22, and the extension portion 474 directly contacts the thermal interface member 22, and the arcuate-shaped end surfaces 470, 472 of the pouch-type battery cell 270 are disposed directly on and against the arcuate-shaped surfaces 70, 72, respectively, of the thermal interface member 22.

Referring to FIG. 5, the pouch-type battery cell 280 includes first and second electrical terminals (not shown) and an outer housing 564. The outer housing 564 includes a first end portion 565, a second end portion 566, and third and fourth end portions (not shown), and major surfaces 567, 568. The first and second end portions 565, 566 extend substantially parallel to one another. The third and fourth end portions of the outer housing 564 extend substantially parallel to one another, and substantially perpendicular to the first and second end portions 565, 566. The major surface 567 is disposed between the first end portion 565 and the second end portion 566. Further, the major surface 568 extends substantially parallel to the major surface 567 and is disposed between the first and second end portions 565, 566. The first and second electrical terminals of the pouch-type battery cell 280 extend outwardly from the third and fourth end portions, respectively, of the pouch-type battery cell 280.

The first end portion 565 has an extension portion 584 and arcuate-shaped end surfaces 580, 582. The extension portion 584 has a first end and a second end. The arcuate-shaped end surface 580 extends from the first end of the extension portion 584. Also, the arcuate-shaped end surface 582 extends from the first end of the extension portion 584 and away from the arcuate-shaped end surface 580. A length of the extension portion 584 is in a range of 1.0-5.0 millimeters.

The second end portion 566 has an extension portion 587 and arcuate-shaped end surfaces 585, 586. The extension portion 587 has a first end and a second end. The arcuate-shaped end surface 585 extends from the first end of the extension portion 587. Also, the arcuate-shaped end surface 586 extends from the first end of the extension portion 587 and away from the arcuate-shaped end surface 585. A length of the extension portion 587 is greater than a length of the extension portion 584.

The pouch-type battery cell 280 is disposed directly on the thermal interface member 22 such that the extension portion 584 is disposed in the groove 84 of the thermal interface member 22, and the extension portion 584 directly contacts the thermal interface member 22, and the arcuate-shaped end surfaces 580, 582 of the pouch-type battery cell 280 are disposed directly on and against the arcuate-shaped surfaces 80, 82, respectively, of the thermal interface member 22.

The pouch-type battery cell 290 includes first and second electrical terminals (not shown) and an outer housing 664. The outer housing 664 includes a first end portion 665, a second end portion 666, and third and fourth end portions (not shown), and major surfaces 667, 668. The first and second end portions 665, 666 extend substantially parallel to one another. The third and fourth end portions of the outer housing 664 extend substantially parallel to one another, and substantially perpendicular to the first and second end portions 665, 666. The major surface 667 is disposed between the first end portion 665 and the second end portion 666. Further, the major surface 668 extends substantially parallel to the major surface 667 and is disposed between the first and second end portions 665, 666. The first and second electrical terminals of the pouch-type battery cell 290 extend outwardly from the third and fourth end portions, respectively, of the pouch-type battery cell 290.

The first end portion 665 has an extension portion 694 and arcuate-shaped end surfaces 690, 692. The extension portion 694 has a first end and a second end. The arcuate-shaped end surface 690 extends from the first end of the extension portion 694. Also, the arcuate-shaped end surface 692 extends from the first end of the extension portion 694 and away from the arcuate-shaped end surface 690. A length of the extension portion 694 is in a range of 1.0-5.0 millimeters.

The second end portion 666 has an extension portion 697 and arcuate-shaped end surfaces 695, 696. The extension portion 697 has a first end and a second end. The arcuate-shaped end surface 695 extends from the first end of the extension portion 697. Also, the arcuate-shaped end surface 696 extends from the first end of the extension portion 697 and away from the arcuate-shaped end surface 695. A length of the extension portion 697 is greater than a length of the extension portion 694.

The pouch-type battery cell 290 is disposed directly on the thermal interface member 22 such that the extension portion 694 is disposed in the groove 94 of the thermal interface member 22, and the extension portion 694 directly contacts the thermal interface member 22, and the arcuate-shaped end surfaces 690, 692 of the pouch-type battery cell 290 are disposed directly on and against the arcuate-shaped surfaces 90, 92, respectively, of the thermal interface member 22.

The pouch-type battery cell 300 includes first and second electrical terminals (not shown) and an outer housing 764. The outer housing 764 includes a first end portion 765, a second end portion 766, and third and fourth end portions (not shown), and major surfaces 767, 768. The first and second end portions 765, 766 extend substantially parallel to one another. The third and fourth end portions of the outer housing 764 extend substantially parallel to one another, and substantially perpendicular to the first and second end portions 765, 766. The major surface 767 is disposed between the first end portion 765 and the second end portion 766. Further, the major surface 768 extends substantially parallel to the major surface 767 and is disposed between the first and second end portions 765, 766. The first and second electrical terminals of the pouch-type battery cell 300 extend outwardly from the third and fourth end portions, respectively, of the pouch-type battery cell 300.

The first end portion 765 has an extension portion 804 and arcuate-shaped end surfaces 800, 802. The extension portion 804 has a first end and a second end. The arcuate-shaped end surface 800 extends from the first end of the extension portion 804. Also, the arcuate-shaped end surface 802 extends from the first end of the extension portion 804 and away from the arcuate-shaped end surface 800. A length of the extension portion 804 is in a range of 1.0-5.0 millimeters.

The second end portion 766 has an extension portion 807 and arcuate-shaped end surfaces 805, 806. The extension portion 807 has a first end and a second end. The arcuate-shaped end surface 805 extends from the first end of the extension portion 807. Also, the arcuate-shaped end surface 806 extends from the first end of the extension portion 807 and away from the arcuate-shaped end surface 805. A length of the extension portion 807 is greater than a length of the extension portion 804.

The pouch-type battery cell 300 is disposed directly on the thermal interface member 22 such that the extension portion 804 is disposed in the groove 104 of the thermal interface member 22, and the extension portion 804 directly contacts the thermal interface member 22, and the arcuate-shaped end surfaces 800, 802 of the pouch-type battery cell 300 are disposed directly on and against the arcuate-shaped surfaces 100, 102, respectively, of the thermal interface member 22.

The pouch-type battery cell 310 includes first and second electrical terminals (not shown) and an outer housing 864. The outer housing 864 includes a first end portion 865, a second end portion 866, and third and fourth end portions (not shown), and major surfaces 867, 868. The first and second end portions 865, 866 extend substantially parallel to one another. The third and fourth end portions of the outer housing 864 extend substantially parallel to one another, and substantially perpendicular to the first and second end portions 865, 866. The major surface 867 is disposed between the first end portion 865 and the second end portion 866. Further, the major surface 868 extends substantially parallel to the major surface 867 and is disposed between the first and second end portions 865, 866. The first and second electrical terminals of the pouch-type battery cell 310 extend outwardly from the third and fourth end portions, respectively, of the pouch-type battery cell 310.

The first end portion 865 has an extension portion 914 and arcuate-shaped end surfaces 910, 912. The extension portion 914 has a first end and a second end. The arcuate-shaped end surface 910 extends from the first end of the extension portion 914. Also, the arcuate-shaped end surface 912 extends from the first end of the extension portion 914 and away from the arcuate-shaped end surface 910. A length of the extension portion 914 is in a range of 1.0-5.0 millimeters.

The second end portion 866 has an extension portion 917 and arcuate-shaped end surfaces 915, 916. The extension portion 917 has a first end and a second end. The arcuate-shaped end surface 915 extends from the first end of the extension portion 917. Also, the arcuate-shaped end surface 916 extends from the first end of the extension portion 917 and away from the arcuate-shaped end surface 915. A length of the extension portion 917 is greater than a length of the extension portion 914.

The pouch-type battery cell 310 is disposed directly on the thermal interface member 22 such that the extension portion 914 is disposed in the groove 114 of the thermal interface member 22, and the extension portion 914 directly contacts the thermal interface member 22, and the arcuate-shaped end surfaces 910, 912 of the pouch-type battery cell 310 are disposed directly on and against the arcuate-shaped surfaces 110, 112, respectively, of the thermal interface member 22.

The pouch-type battery cell 320 includes first and second electrical terminals (not shown) and an outer housing 964. The outer housing 964 includes a first end portion 965, a second end portion 966, and third and fourth end portions (not shown), and major surfaces 967, 968. The first and second end portions 965, 966 extend substantially parallel to one another. The third and fourth end portions of the outer housing 964 extend substantially parallel to one another, and substantially perpendicular to the first and second end portions 965, 966. The major surface 967 is disposed between the first end portion 965 and the second end portion 966. Further, the major surface 968 extends substantially parallel to the major surface 967 and is disposed between the first and second end portions 965, 966. The first and second electrical terminals of the pouch-type battery cell 320 extend outwardly from the third and fourth end portions, respectively, of the pouch-type battery cell 320.

The first end portion 965 has an extension portion 1024 and arcuate-shaped end surfaces 1020, 1022. The extension portion 1024 has a first end and a second end. The arcuate-shaped end surface 1020 extends from the first end of the extension portion 1024. Also, the arcuate-shaped end surface 1022 extends from the first end of the extension portion 1024 and away from the arcuate-shaped end surface 1020. A length of the extension portion 1024 is in a range of 1.0-5.0 millimeters.

The second end portion 966 has an extension portion 1027 and arcuate-shaped end surfaces 1025, 1026. The extension portion 1027 has a first end and a second end. The arcuate-shaped end surface 1025 extends from the first end of the extension portion 1027. Also, the arcuate-shaped end surface 1026 extends from the first end of the extension portion 1027 and away from the arcuate-shaped end surface 1025. A length of the extension portion 1027 is greater than a length of the extension portion 1024.

The pouch-type battery cell 320 is disposed directly on the thermal interface member 22 such that the extension portion 1024 is disposed in the groove 124 of the thermal interface member 22, and the extension portion 1024 directly contacts the thermal interface member 22, and the arcuate-shaped end surfaces 1020, 1022 of the pouch-type battery cell 320 are disposed directly on and against the arcuate-shaped surfaces 120, 122, respectively, of the thermal interface member 22.

The pouch-type battery cell 330 includes first and second electrical terminals (not shown) and an outer housing 1064. The outer housing 1064 includes a first end portion 1065, a second end portion 1066, and third and fourth end portions (not shown), and major surfaces 1067, 1068. The first and second end portions 1065, 1066 extend substantially parallel to one another. The third and fourth end portions of the outer housing 1064 extend substantially parallel to one another, and substantially perpendicular to the first and second end portions 1065, 1066. The major surface 1067 is disposed between the first end portion 1065 and the second end portion 1066. Further, the major surface 1068 extends substantially parallel to the major surface 1067 and is disposed between the first and second end portions 1065, 1066. The first and second electrical terminals of the pouch-type battery cell 330 extend outwardly from the third and fourth end portions, respectively, of the pouch-type battery cell 330.

The first end portion 1065 has an extension portion 1134 and arcuate-shaped end surfaces 1130, 1132. The extension portion 1134 has a first end and a second end. The arcuate-shaped end surface 1130 extends from the first end of the extension portion 1134. Also, the arcuate-shaped end surface 1132 extends from the first end of the extension portion 1134 and away from the arcuate-shaped end surface 1130. A length of the extension portion 1134 is in a range of 1.0-5.0 millimeters.

The second end portion 1066 has an extension portion 1137 and arcuate-shaped end surfaces 1135, 1136. The extension portion 1137 has a first end and a second end. The arcuate-shaped end surface 1135 extends from the first end of the extension portion 1137. Also, the arcuate-shaped end surface 1136 extends from the first end of the extension portion 1137 and away from the arcuate-shaped end surface 1135. A length of the extension portion 1137 is greater than a length of the extension portion 1134.

The pouch-type battery cell 330 is disposed directly on the thermal interface member 22 such that the extension portion 1134 is disposed in the groove 134 of the thermal interface member 22, and the extension portion 1134 directly contacts the thermal interface member 22, and the arcuate-shaped end surfaces 1130, 1132 of the pouch-type battery cell 330 are disposed directly on and against the arcuate-shaped surfaces 130, 132, respectively, of the thermal interface member 22.

The pouch-type battery cell 340 includes first and second electrical terminals (not shown) and an outer housing 1164. The outer housing 1164 includes a first end portion 1165, a second end portion 1166, and third and fourth end portions (not shown), and major surfaces 1167, 1168. The first and second end portions 1165, 1166 extend substantially parallel to one another. The third and fourth end portions of the outer housing 1164 extend substantially parallel to one another, and substantially perpendicular to the first and second end portions 1165, 1166. The major surface 1167 is disposed between the first end portion 1165 and the second end portion 1166. Further, the major surface 1168 extends substantially parallel to the major surface 1167 and is disposed between the first and second end portions 1165, 1166. The first and second electrical terminals of the pouch-type battery cell 340 extend outwardly from the third and fourth end portions, respectively, of the pouch-type battery cell 340.

The first end portion 1165 has an extension portion 1244 and arcuate-shaped end surfaces 1240, 1242. The extension portion 1244 has a first end and a second end. The arcuate-shaped end surface 1240 extends from the first end of the extension portion 1244. Also, the arcuate-shaped end surface 1242 extends from the first end of the extension portion 1244 and away from the arcuate-shaped end surface 1240. A length of the extension portion 1244 is in a range of 1.0-5.0 millimeters.

The second end portion 1166 has an extension portion 1247 and arcuate-shaped end surfaces 1245, 1246. The extension portion 1247 has a first end and a second end. The arcuate-shaped end surface 1245 extends from the first end of the extension portion 1247. Also, the arcuate-shaped end surface 1246 extends from the first end of the extension portion 1247 and away from the arcuate-shaped end surface 1245. A length of the extension portion 1247 is greater than a length of the extension portion 1244.

The pouch-type battery cell 340 is disposed directly on the thermal interface member 22 such that the extension portion 1244 is disposed in the groove 144 of the thermal interface member 22, and the extension portion 1244 directly contacts the thermal interface member 22, and the arcuate-shaped end surfaces 1240, 1242 of the pouch-type battery cell 340 are disposed directly on and against the arcuate-shaped surfaces 140, 142, respectively, of the thermal interface member 22.

The pouch-type battery cell 350 includes first and second electrical terminals (not shown) and an outer housing 1264. The outer housing 1264 includes a first end portion 1265, a second end portion 1266, and third and fourth end portions (not shown), and major surfaces 1267, 1268. The first and second end portions 1265, 1266 extend substantially parallel to one another. The third and fourth end portions of the outer housing 1264 extend substantially parallel to one another, and substantially perpendicular to the first and second end portions 1265, 1266. The major surface 1267 is disposed between the first end portion 1265 and the second end portion 1266. Further, the major surface 1268 extends substantially parallel to the major surface 1267 and is disposed between the first and second end portions 1265, 1266. The first and second electrical terminals of the pouch-type battery cell 350 extend outwardly from the third and fourth end portions, respectively, of the pouch-type battery cell 350.

The first end portion 1265 has an extension portion 1354 and arcuate-shaped end surfaces 1350, 1352. The extension portion 1354 has a first end and a second end. The arcuate-shaped end surface 1350 extends from the first end of the extension portion 1354. Also, the arcuate-shaped end surface 1352 extends from the first end of the extension portion 1354 and away from the arcuate-shaped end surface 1350. A length of the extension portion 1354 is in a range of 1.0-5.0 millimeters.

The second end portion 1266 has an extension portion 1357 and arcuate-shaped end surfaces 1355, 1356. The extension portion 1357 has a first end and a second end. The arcuate-shaped end surface 1355 extends from the first end of the extension portion 1357. Also, the arcuate-shaped end surface 1356 extends from the first end of the extension portion 1357 and away from the arcuate-shaped end surface 1355. A length of the extension portion 1357 is greater than a length of the extension portion 1354.

The pouch-type battery cell 350 is disposed directly on the thermal interface member 22 such that the extension portion 1354 is disposed in the groove 154 of the thermal interface member 22, and the extension portion 1354 directly contacts the thermal interface member 22, and the arcuate-shaped end surfaces 1350, 1352 of the pouch-type battery cell 350 are disposed directly on and against the arcuate-shaped surfaces 150, 152, respectively, of the thermal interface member 22.

The pouch-type battery cell 360 includes first and second electrical terminals (not shown) and an outer housing 1464. The outer housing 1464 includes a first end portion 1465, a second end portion 1466, and third and fourth end portions (not shown), and major surfaces 1467, 1468. The first and second end portions 1465, 1466 extend substantially parallel to one another. The third and fourth end portions of the outer housing 1464 extend substantially parallel to one another, and substantially perpendicular to the first and second end portions 1465, 1466. The major surface 1467 is disposed between the first end portion 1465 and the second end portion 1466. Further, the major surface 1468 extends substantially parallel to the major surface 1467 and is disposed between the first and second end portions 1465, 1466. The first and second electrical terminals of the pouch-type battery cell 360 extend outwardly from the third and fourth end portions, respectively, of the pouch-type battery cell 360.

The first end portion 1465 has an extension portion 1564 and arcuate-shaped end surfaces 1560, 1562. The extension portion 1564 has a first end and a second end. The arcuate-shaped end surface 1560 extends from the first end of the extension portion 1564. Also, the arcuate-shaped end surface 1562 extends from the first end of the extension portion 1564 and away from the arcuate-shaped end surface 1560. A length of the extension portion 1564 is in a range of 1.0-5.0 millimeters.

The second end portion 1466 has an extension portion 1567 and arcuate-shaped end surfaces 1565, 1566. The extension portion 1567 has a first end and a second end. The arcuate-shaped end surface 1565 extends from the first end of the extension portion 1567. Also, the arcuate-shaped end surface 1566 extends from the first end of the extension portion 1567 and away from the arcuate-shaped end surface 1565. A length of the extension portion 1567 is greater than a length of the extension portion 1564.

The pouch-type battery cell 360 is disposed directly on the thermal interface member 22 such that the extension portion 1564 is disposed in the groove 164 of the thermal interface member 22, and the extension portion 1564 directly contacts the thermal interface member 22, and the arcuate-shaped end surfaces 1560, 1562 of the pouch-type battery cell 360 are disposed directly on and against the arcuate-shaped surfaces 160, 162, respectively, of the thermal interface member 22.

The pouch-type battery cell 370 includes first and second electrical terminals (not shown) and an outer housing 1664. The outer housing 1664 includes a first end portion 1665, a second end portion 1666, and third and fourth end portions (not shown), and major surfaces 1667, 1668. The first and second end portions 1665, 1666 extend substantially parallel to one another. The third and fourth end portions of the outer housing 1664 extend substantially parallel to one another, and substantially perpendicular to the first and second end portions 1665, 1666. The major surface 1667 is disposed between the first end portion 1665 and the second end portion 1666. Further, the major surface 1668 extends substantially parallel to the major surface 1667 and is disposed between the first and second end portions 1665, 1666. The first and second electrical terminals of the pouch-type battery cell 370 extend outwardly from the third and fourth end portions, respectively, of the pouch-type battery cell 370.

The first end portion 1665 has an extension portion 1774 and arcuate-shaped end surfaces 1770, 1772. The extension portion 1774 has a first end and a second end. The arcuate-shaped end surface 1770 extends from the first end of the extension portion 1774. Also, the arcuate-shaped end surface 1772 extends from the first end of the extension portion 1774 and away from the arcuate-shaped end surface 1770. A length of the extension portion 1774 is in a range of 1.0-5.0 millimeters.

The second end portion 1666 has an extension portion 1777 and arcuate-shaped end surfaces 1775, 1776. The extension portion 1777 has a first end and a second end. The arcuate-shaped end surface 1775 extends from the first end of the extension portion 1777. Also, the arcuate-shaped end surface 1776 extends from the first end of the extension portion 1777 and away from the arcuate-shaped end surface 1775. A length of the extension portion 1777 is greater than a length of the extension portion 1774.

The pouch-type battery cell 370 is disposed directly on the thermal interface member 22 such that the extension portion 1774 is disposed in the groove 174 of the thermal interface member 22, and the extension portion 1774 directly contacts the thermal interface member 22, and the arcuate-shaped end surfaces 1770, 1772 of the pouch-type battery cell 370 are disposed directly on and against the arcuate-shaped surfaces 170, 172, respectively, of the thermal interface member 22.

The pouch-type battery cell 380 includes first and second electrical terminals (not shown) and an outer housing 1864. The outer housing 1864 includes a first end portion 1865, a second end portion 1866, and third and fourth end portions (not shown), and major surfaces 1867, 1868. The first and second end portions 1865, 1866 extend substantially parallel to one another. The third and fourth end portions of the outer housing 1864 extend substantially parallel to one another, and substantially perpendicular to the first and second end portions 1865, 1866. The major surface 1867 is disposed between the first end portion 1865 and the second end portion 1866. Further, the major surface 1868 extends substantially parallel to the major surface 1867 and is disposed between the first and second end portions 1865, 1866. The first and second electrical terminals of the pouch-type battery cell 380 extend outwardly from the third and fourth end portions, respectively, of the pouch-type battery cell 380.

The first end portion 1865 has an extension portion 1884 and arcuate-shaped end surfaces 1880, 1882. The extension portion 1884 has a first end and a second end. The arcuate-shaped end surface 1880 extends from the first end of the extension portion 1884. Also, the arcuate-shaped end surface 1882 extends from the first end of the extension portion 1884 and away from the arcuate-shaped end surface 1880. A length of the extension portion 1884 is in a range of 1.0-5.0 millimeters.

The second end portion 1866 has an extension portion 1887 and arcuate-shaped end surfaces 1885, 1886. The extension portion 1887 has a first end and a second end. The arcuate-shaped end surface 1885 extends from the first end of the extension portion 1887. Also, the arcuate-shaped end surface 1886 extends from the first end of the extension portion 1887 and away from the arcuate-shaped end surface 1885. A length of the extension portion 1887 is greater than a length of the extension portion 1884.

The pouch-type battery cell 380 is disposed directly on the thermal interface member 22 such that the extension portion 1884 is disposed in the groove 184 of the thermal interface member 22, and the extension portion 1884 directly contacts the thermal interface member 22, and the arcuate-shaped end surfaces 1880, 1882 of the pouch-type battery cell 380 are disposed directly on and against the arcuate-shaped surfaces 180, 182, respectively, of the thermal interface member 22.

The pouch-type battery cell 390 includes first and second electrical terminals (not shown) and an outer housing 1964. The outer housing 1964 includes a first end portion 1965, a second end portion 1966, and third and fourth end portions (not shown), and major surfaces 1967, 1968. The first and second end portions 1965, 1966 extend substantially parallel to one another. The third and fourth end portions of the outer housing 1964 extend substantially parallel to one another, and substantially perpendicular to the first and second end portions 1965, 1966. The major surface 1967 is disposed between the first end portion 1965 and the second end portion 1966. Further, the major surface 1968 extends substantially parallel to the major surface 1967 and is disposed between the first and second end portions 1965, 1966. The first and second electrical terminals of the pouch-type battery cell 390 extend outwardly from the third and fourth end portions, respectively, of the pouch-type battery cell 390.

The first end portion 1965 has an extension portion 1994 and arcuate-shaped end surfaces 1990, 1992. The extension portion 1994 has a first end and a second end. The arcuate-shaped end surface 1990 extends from the first end of the extension portion 1994. Also, the arcuate-shaped end surface 1992 extends from the first end of the extension portion 1994 and away from the arcuate-shaped end surface 1990. A length of the extension portion 1994 is in a range of 1.0-5.0 millimeters.

The second end portion 1966 has an extension portion 1997 and arcuate-shaped end surfaces 1995, 1996. The extension portion 1997 has a first end and a second end. The arcuate-shaped end surface 1995 extends from the first end of the extension portion 1997. Also, the arcuate-shaped end surface 1996 extends from the first end of the extension portion 1997 and away from the arcuate-shaped end surface 1995. A length of the extension portion 1997 is greater than a length of the extension portion 1994.

The pouch-type battery cell 390 is disposed directly on the thermal interface member 22 such that the extension portion 1994 is disposed in the groove 194 of the thermal interface member 22, and the extension portion 1994 directly contacts the thermal interface member 22, and the arcuate-shaped end surfaces 1990, 1992 of the pouch-type battery cell 390 are disposed directly on and against the arcuate-shaped surfaces 190, 192, respectively, of the thermal interface member 22.

The pouch-type battery cell 400 includes first and second electrical terminals (not shown) and an outer housing 2064. The outer housing 2064 includes a first end portion 2065, a second end portion 2066, and third and fourth end portions (not shown), and major surfaces 2067, 2068. The first and second end portions 2065, 2066 extend substantially parallel to one another. The third and fourth end portions of the outer housing 2064 extend substantially parallel to one another, and substantially perpendicular to the first and second end portions 2065, 2066. The major surface 2067 is disposed between the first end portion 2065 and the second end portion 2066. Further, the major surface 2068 extends substantially parallel to the major surface 2067 and is disposed between the first and second end portions 2065, 2066. The first and second electrical terminals of the pouch-type battery cell 400 extend outwardly from the third and fourth end portions, respectively, of the pouch-type battery cell 400.

The first end portion 2065 has an extension portion 2104 and arcuate-shaped end surfaces 2100, 2102. The extension portion 2104 has a first end and a second end. The arcuate-shaped end surface 2100 extends from the first end of the extension portion 2104. Also, the arcuate-shaped end surface 2102 extends from the first end of the extension portion 2104 and away from the arcuate-shaped end surface 2100. A length of the extension portion 2104 is in a range of 1.0-5.0 millimeters.

The second end portion 2066 has an extension portion 2107 and arcuate-shaped end surfaces 2105, 2106. The extension portion 2107 has a first end and a second end. The arcuate-shaped end surface 2105 extends from the first end of the extension portion 2107. Also, the arcuate-shaped end surface 2106 extends from the first end of the extension portion 2107 and away from the arcuate-shaped end surface 2105. A length of the extension portion 2107 is greater than a length of the extension portion 2104.

The pouch-type battery cell 400 is disposed directly on the thermal interface member 22 such that the extension portion 2104 is disposed in the groove 204 of the thermal interface member 22, and the extension portion 2104 directly contacts the thermal interface member 22, and the arcuate-shaped end surfaces 2100, 2102 of the pouch-type battery cell 400 are disposed directly on and against the arcuate-shaped surfaces 200, 202, respectively, of the thermal interface member 22.

The pouch-type battery cell 410 includes first and second electrical terminals (not shown) and an outer housing 2164. The outer housing 2164 includes a first end portion 2165, a second end portion 2166, and third and fourth end portions (not shown), and major surfaces 2167, 2168. The first and second end portions 2165, 2166 extend substantially parallel to one another. The third and fourth end portions of the outer housing 2164 extend substantially parallel to one another, and substantially perpendicular to the first and second end portions 2165, 2166. The major surface 2167 is disposed between the first end portion 2165 and the second end portion 2166. Further, the major surface 2168 extends substantially parallel to the major surface 2167 and is disposed between the first and second end portions 2165, 2166. The first and second electrical terminals of the pouch-type battery cell 410 extend outwardly from the third and fourth end portions, respectively, of the pouch-type battery cell 410.

The first end portion 2165 has an extension portion 2214 and arcuate-shaped end surfaces 2210, 2212. The extension portion 2214 has a first end and a second end. The arcuate-shaped end surface 2210 extends from the first end of the extension portion 2214. Also, the arcuate-shaped end surface 2212 extends from the first end of the extension portion 2214 and away from the arcuate-shaped end surface 2210. A length of the extension portion 2214 is in a range of 1.0-5.0 millimeters.

The second end portion 2166 has an extension portion 2217 and arcuate-shaped end surfaces 2215, 2216. The extension portion 2217 has a first end and a second end. The arcuate-shaped end surface 2215 extends from the first end of the extension portion 2217. Also, the arcuate-shaped end surface 2216 extends from the first end of the extension portion 2217 and away from the arcuate-shaped end surface 2215. A length of the extension portion 2217 is greater than a length of the extension portion 2214.

The pouch-type battery cell 410 is disposed directly on the thermal interface member 22 such that the extension portion 2214 is disposed in the groove 214 of the thermal interface member 22, and the extension portion 2214 directly contacts the thermal interface member 22, and the arcuate-shaped end surfaces 2210, 2212 of the pouch-type battery cell 410 are disposed directly on and against the arcuate-shaped surfaces 210, 212, respectively, of the thermal interface member 22.

The pouch-type battery cell 420 includes first and second electrical terminals (not shown) and an outer housing 2264. The outer housing 2264 includes a first end portion 2265, a second end portion 2266, and third and fourth end portions (not shown), and major surfaces 2267, 2268. The first and second end portions 2265, 2266 extend substantially parallel to one another. The third and fourth end portions of the outer housing 2264 extend substantially parallel to one another, and substantially perpendicular to the first and second end portions 2265, 2266. The major surface 2267 is disposed between the first end portion 2265 and the second end portion 2266. Further, the major surface 2268 extends substantially parallel to the major surface 2267 and is disposed between the first and second end portions 2265, 2266. The first and second electrical terminals of the pouch-type battery cell 420 extend outwardly from the third and fourth end portions, respectively, of the pouch-type battery cell 420.

The first end portion 2265 has an extension portion 2324 and arcuate-shaped end surfaces 2320, 2322. The extension portion 2324 has a first end and a second end. The arcuate-shaped end surface 2320 extends from the first end of the extension portion 2324. Also, the arcuate-shaped end surface 2322 extends from the first end of the extension portion 2324 and away from the arcuate-shaped end surface 2320. A length of the extension portion 2324 is in a range of 1.0-5.0 millimeters.

The second end portion 2266 has an extension portion 2327 and arcuate-shaped end surfaces 2325, 2326. The extension portion 2327 has a first end and a second end. The arcuate-shaped end surface 2325 extends from the first end of the extension portion 2327. Also, the arcuate-shaped end surface 2326 extends from the first end of the extension portion 2327 and away from the arcuate-shaped end surface 2325. A length of the extension portion 2327 is greater than a length of the extension portion 2324.

The pouch-type battery cell 420 is disposed directly on the thermal interface member 22 such that the extension portion 2324 is disposed in the groove 224 of the thermal interface member 22, and the extension portion 2324 directly contacts the thermal interface member 22, and the arcuate-shaped end surfaces 2320, 2322 of the pouch-type battery cell 420 are disposed directly on and against the arcuate-shaped surfaces 220, 222, respectively, of the thermal interface member 22.

Figure 1:
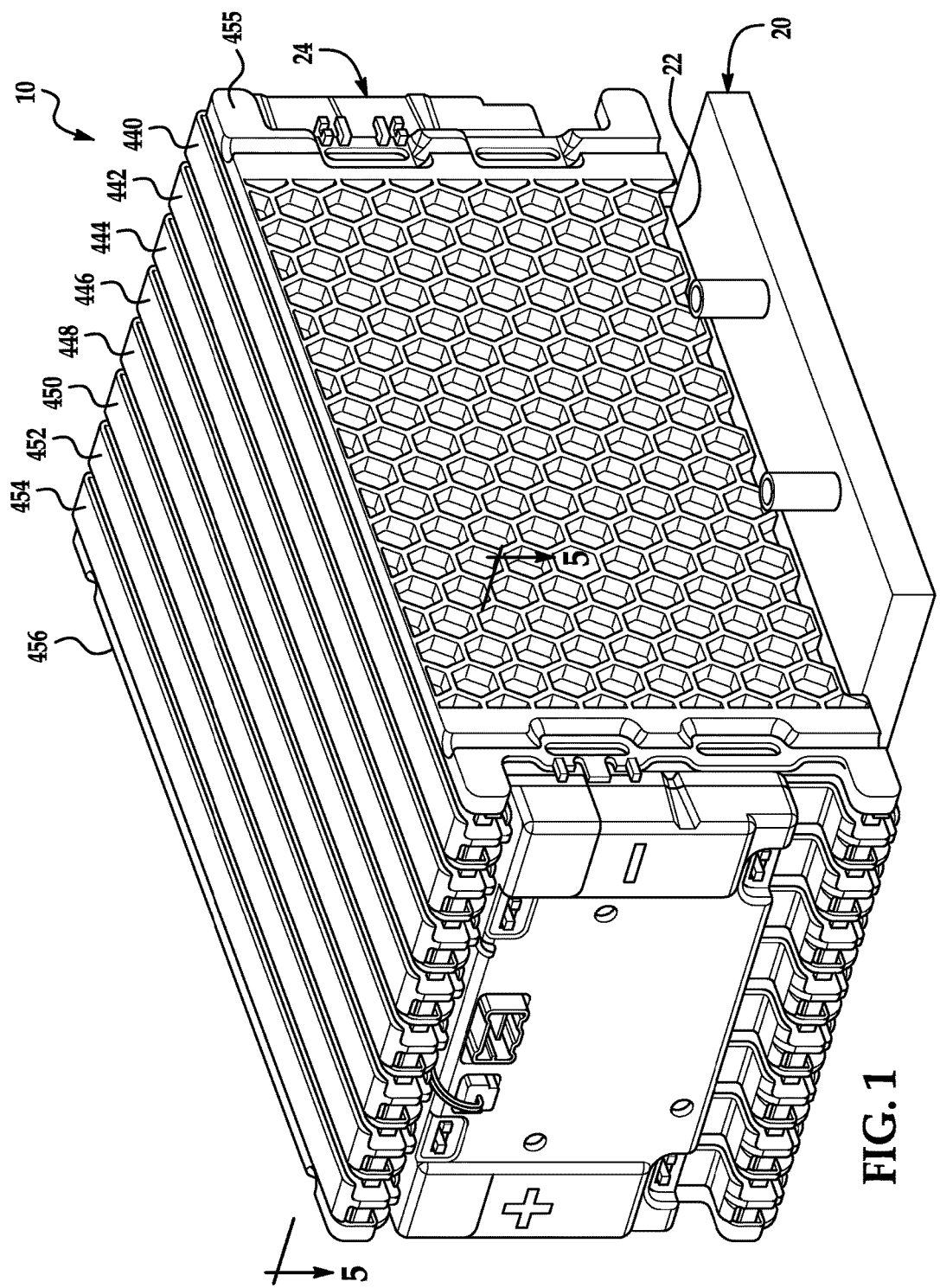
FIG. 1 is a schematic of a battery system in accordance with an exemplary embodiment.

Referring to FIGS. 1 and 5, the plastic frame members 440-454 and the end plates 455, 456 are provided to hold the pouch-type battery cells 270-420 therebetween. The structure of the plastic frame member 440 is identical to the structure of the plastic frame members 442-454. Thus, only the structure of the plastic frame member 440 will be discussed in greater detail below.

The plastic frame member 440 is coupled to the end plate 455. The pouch-type battery cell 270 directly contacts and is held between the plastic frame member 440 and the end plate 455.

Referring to FIGS. 5 and 8-11, the plastic frame member 440 has a substantially rectangular-shaped wall 2500, a top wall 2502, side walls 2504, 2506 and coupling portions 2520, 2522, 2524, 2526. The top wall 2502 is coupled to a top end 2530 of the substantially rectangular-shaped wall 2500. Further, the side walls 2504, 2506 are coupled to side ends 2532, 2534, respectively, of the substantially rectangular-shaped wall 2500 such that the side walls 2504, 2506 extend substantially parallel to one another. The side walls 2504, 2506 extend past a bottom end 2536 of the substantially rectangular-shaped wall 2500 such that a first gap is defined between the bottom end 2536 of the substantially rectangular-shaped wall 2500 and the side walls 2504, 2506 of the plastic frame member 440. A portion of the thermal interface member 22 is disposed within the first gap.

The coupling portion 2520 is coupled to the side wall 2504 and has a first side and a second side. The first side of the coupling portion 2520 has a male coupling member 2550 (shown in FIG. 8) that holds a coupling clip 2552 thereon. The coupling clip 2552 is configured to be removably coupled to a corresponding female coupling member of an adjacent plastic frame member or end plate. The second side of the coupling portion 2520 has a female coupling member 2554 (shown in FIG. 10). The female coupling member 2554 is configured to be removably coupled to a corresponding male coupling member of an adjacent plastic frame member or end plate.

The coupling portion 2522 is coupled to the side wall 2506 and has a first side and a second side. The first side of the coupling portion 2522 has a male coupling member 2570 (shown in FIG. 8) that holds a coupling clip 2572 thereon. The coupling clip 2572 is configured to be removably coupled to a corresponding female coupling member of an adjacent plastic frame member or end plate. The second side of the coupling portion 2522 has a female coupling member 2574 (shown in FIG. 10). The female coupling member 2574 is configured to be removably coupled to a corresponding male coupling member of an adjacent plastic frame member or end plate.

The coupling portion 2524 is coupled to the side wall 2504 and has a first side and a second side. The first side of the coupling portion 2524 has a male coupling member 2590 (shown in FIG. 8) that holds a coupling clip 2592 thereon. The coupling clip 2592 is configured to be removably coupled to a corresponding female coupling member of an adjacent plastic frame member or end plate. The second side of the coupling portion 2524 has a female coupling member 2594 (shown in FIG. 10). The female coupling member 2594 is configured to be removably coupled to a corresponding male coupling member of an adjacent plastic frame member or end plate.

The coupling portion 2526 is coupled to the side wall 2506 and has a first side and a second side. The first side of the coupling portion 2526 has a male coupling member 2600 (shown in FIG. 8) that holds a coupling clip 2602 thereon. The coupling clip 2602 is configured to be removably coupled to a corresponding female coupling member of adjacent plastic frame member or end plate. The second side of the coupling portion 2526 has a female coupling member 2604 (shown in FIG. 10). The female coupling member 2604 is configured to be removably coupled to a corresponding male coupling member of an adjacent plastic frame member or end plate.

Referring to FIG. 5, the major surface 468 of the outer housing 460 of the pouch-type battery cell 270 is disposed directly against the substantially rectangular-shaped wall 2500 of the plastic frame member 440. Further, the major surface 567 of the outer housing 564 of the pouch-type battery cell 280 is disposed directly against the substantially rectangular-shaped wall 2500 of the plastic frame member 440. Further, the thermal interface member 22 is disposed below the pouch-type battery cells 270, 280 within the first gap of the plastic frame member 440 between the bottom end 2536 (shown in FIG. 8) of the substantially rectangular-shaped wall 2500 of the frame member 440 and the top surface 46 of the thermally conductive base member 20.

Referring to FIG. 5, the plastic frame member 442 is coupled to the plastic frame member 440. The pouch-type battery cells 280, 290 directly contact the plastic frame members 440, 442 respectively, and are held between the plastic frame members 440, 442.

The plastic frame member 444 is coupled to the plastic frame member 442. The pouch-type battery cells 300, 310 directly contact the plastic frame members 442, 444 respectively, and are held between the plastic frame members 442, 444.

The plastic frame member 446 is coupled to the plastic frame member 444. The pouch-type battery cells 320, 330 directly contact the plastic frame members 444, 445 respectively, and are held between the plastic frame members 444, 446.

The plastic frame member 448 is coupled to the plastic frame member 446. The pouch-type battery cells 340, 350 directly contact the plastic frame members 446, 448 respectively, and are held between the plastic frame members 446, 448.

The plastic frame member 450 is coupled to the plastic frame member 448. The pouch-type battery cells 360, 370 directly contact the plastic frame members 448, 450 respectively, and are held between the plastic frame members 448, 450.

The plastic frame member 452 is coupled to the plastic frame member 450. The pouch-type battery cells 380, 390 directly contact the plastic frame members 450, 452 respectively, and are held between the plastic frame members 450, 452.

The plastic frame member 454 is coupled to the plastic frame member 452. The pouch-type battery cells 400, 410 directly contact the plastic frame members 452, 454 respectively, and are held between the plastic frame members 452, 454.

The end plate 456 is coupled to the plastic frame member 454. The pouch-type battery cell 420 directly contacts the end plate 456 and the plastic frame member 454 and is held between the end plate 456 and the plastic frame member 454.

Figure 15:
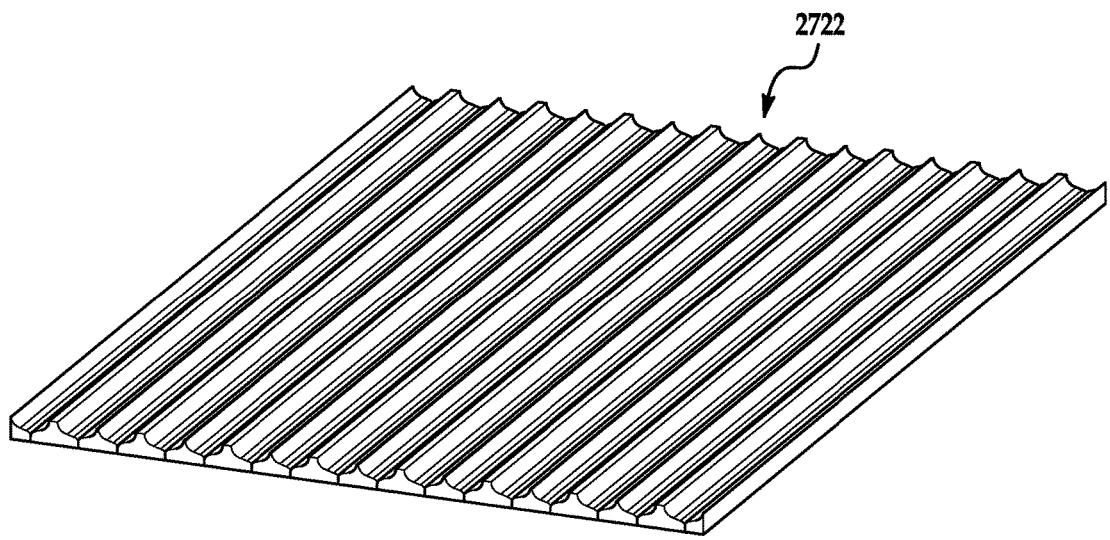
FIG. 15 is a schematic of an alternative thermal interface member.

Referring to FIG. 15, a thermal interface member 2722 that could be utilized in the battery system 10 (shown in FIG. 2) instead of the thermal interface member 22 is illustrated. The thermal interface member 2722 is a pre-formed thermally conductive foam. In particular, the thermal interface member 2722 is a die-cut thermally conductive polyurethane open-cell foam. In an exemplary embodiment, the thermal interface member 2722 has a thermal conductivity in a range of 1.5-3.0 Watts per meter-Kelvin. In an alternative embodiment, the thermal interface member 2722 could be replaced with thermal interface member having an identical outer profile (e.g., outer surfaces) and as the thermal interface member 2722 wherein the thermal interface member is constructed of a metal such as aluminum for example.

Figure 16:
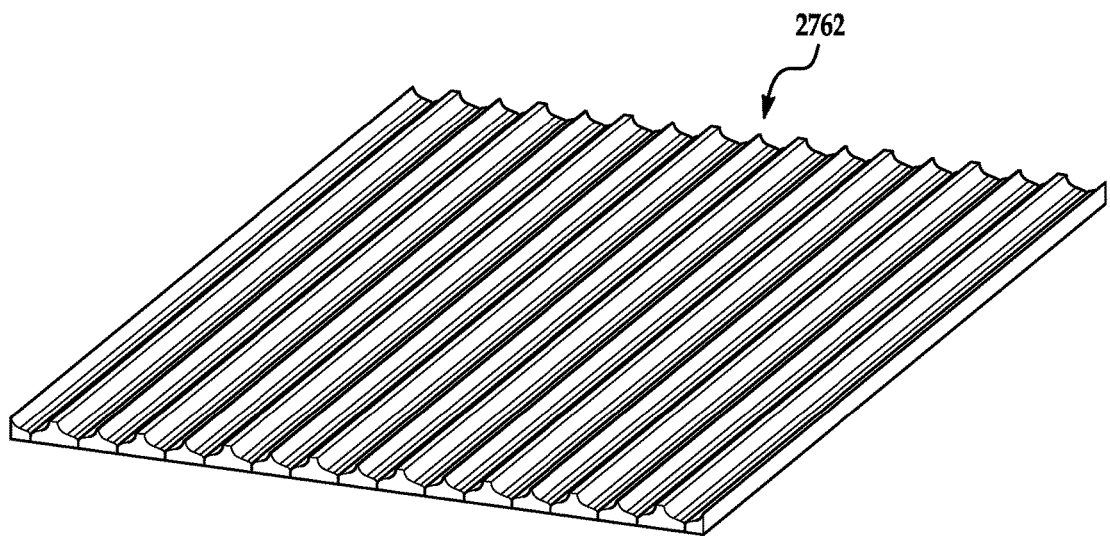
FIG. 16 is a schematic of yet another alternative thermal interface member.

Referring to FIG. 16, a thermal interface member 2762 that could be utilized in the battery system 10 (shown in FIG. 2) instead of the thermal interface member 22 is illustrated. The thermal interface member 2762 is a thermally conductive gel such as a thermally conductive silicon-based gel. In an exemplary embodiment, the thermal interface member 2762 has a thermal conductivity in a range of 1.5-3.0 Watts per meter-Kelvin.

Figure 17:
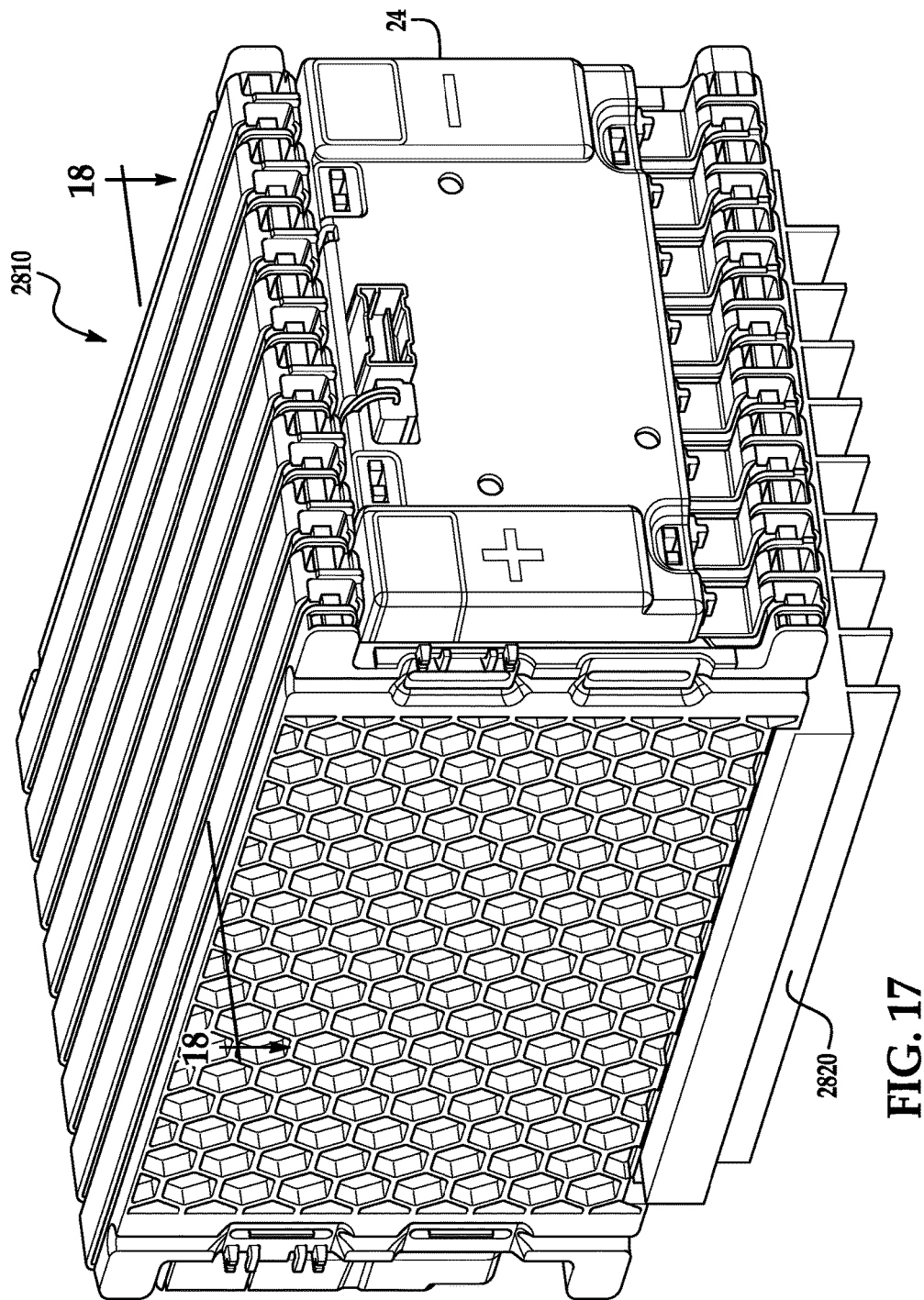
FIG. 17 is a schematic of another battery system in accordance with another exemplary embodiment.

Referring to FIGS. 17 and 18, a battery system 2810 in accordance with another exemplary embodiment is provided. The primary difference between the battery system 2810 and the battery system 10 (shown in FIG. 2) is that the battery system 2810 utilizes a thermally conductive base member 2820 instead of the thermally conductive base member 20. In particular, the battery system 2820 includes the thermally conductive base member 2820, the thermal interface member 22 and the battery module 24.

An advantage of the battery system 2810 is that the battery system 2810 utilizes the thermal interface member 22 that directly contacts end portions of pouch-type battery cells in the battery module 24, which transfers heat energy from the pouch-type battery cells to the thermally conductive base member 2820, without having to use cooling fins disposed between the pouch-type battery cells.

The thermally conductive base member 2820 includes a base plate 2830 and heat fins 2832, 2834, 2836, 2838, 2840, 2842, 2844, 2846, 2848 that extend downwardly from a bottom surface of the base plate 2830. The thermally conductive base member 2820 is provided to conduct heat energy from the thermal interface member 22 to air flowing past the heat fins 2832-2848. In an exemplary embodiment, the base plate 2830 and the heat fins 2832-2848 are constructed of a metal. Of course, in an alternative embodiment, the base plate 2830 and the heat fins 2832-2848 could be constructed of other thermally conductive materials.

The battery systems described herein provide a substantial advantage over other battery systems. In particular, an advantage of the battery systems is that each battery system utilizes a thermal interface member that directly contacts end portions of pouch-type battery cells in a battery module to transfer heat energy from the pouch-type battery cells to a thermally conductive base member, without having to use cooling fins disposed between the pouch-type battery cells.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery system, comprising:
   a thermally conductive base member;
   a thermal interface member disposed on a surface of the thermally conductive base member, the thermal interface member having first and second arcuate-shaped surfaces and a first groove, the first groove being disposed between the first and second arcuate-shaped surfaces and extending into the thermal interface member;
   a battery module having a first pouch battery cell, the first pouch battery cell having a first outer housing with a first end portion and a second end portion, the first end portion of the first outer housing having a first extension portion and first and second arcuate-shaped end surfaces, the first extension portion of the first outer housing having a first end and a second end, the first arcuate-shaped end surface of the first outer housing extending from the first end of the first extension portion of the first outer housing, the second arcuate-shaped end surface of the first outer housing extending from the first end of the first extension portion of the first outer housing and away from the first arcuate-shaped end surface of the first outer housing; and
   the first pouch battery cell being disposed directly on the thermal interface member such that the first extension portion of the first pouch battery cell is disposed in the first groove of the thermal interface member, and the first extension portion of the first outer housing directly contacts the thermal interface member, and the first and second arcuate-shaped end surfaces of the first pouch battery cell are disposed directly on and against the first and second arcuate-shaped surfaces, respectively, of the thermal interface member.

2. The battery system of claim 1, wherein a length of the first extension portion is in a range of 1.0-5.0 millimeters.

3. The battery system of claim 1, wherein the second end portion of the first outer housing having a second extension portion, and a length of the second extension portion being greater than a length of the first extension portion.

4. The battery system of claim 1, wherein the thermal interface member comprises a pre-formed thermally conductive foam.

5. The battery system of claim 4, wherein the pre-formed thermally conductive foam is a molded thermally conductive polyurethane open-cell foam.

6. The battery system of claim 4, wherein the pre-formed thermally conductive foam is a die-cut thermally conductive polyurethane open-cell foam.

7. The battery system of claim 1, wherein the thermal interface member comprises a thermally conductive gel.

8. The battery system of claim 7, wherein the thermally conductive gel is a thermally conductive silicon-based gel.

9. The battery system of claim 1, wherein the thermal interface member has a thermal conductivity in a range of 1.5-3.0 Watts per meter-Kelvin.

10. The battery system of claim 1, wherein the thermal interface member further having third and fourth arcuate-shaped surfaces and a second groove, the second groove being disposed between the third and fourth arcuate-shaped surfaces and extending into the thermal interface member; the first pouch battery cell having a first major surface disposed between the first and second end portions thereof, the battery module further comprising:
   a second pouch battery cell having a second outer housing with a first end portion, a second end portion, and a first major surface disposed between the first and second end portions thereof; the first major surface of the second pouch battery cell being disposed on and directly against the first major surface of the first pouch battery cell; the first end portion of the second outer housing having a first extension portion and first and second arcuate-shaped end surfaces, the first extension portion of the second outer housing having a first end and a second end, the first arcuate-shaped end surface of the second outer housing extending from the first end of the first extension portion of the second outer housing, the second arcuate-shaped end surface of the second outer housing extending from the first end of the first extension portion of the second outer housing and away from the first arcuate-shaped end surface of the second outer housing; and
   the second pouch battery cell being disposed directly on the thermal interface member such that the first extension portion of the second pouch battery cell is disposed in the second groove of the thermal interface member, and the first extension portion of the second outer housing directly contacts the thermal interface member, and the first and second arcuate-shaped end surfaces of the second pouch battery cell being disposed directly on and against the third and fourth arcuate-shaped surfaces, respectively, of the thermal interface member.

11. The battery system of claim 10, wherein the battery module further includes a first plastic frame member having a first substantially rectangular-shaped wall, a first top wall, and first and second side walls, the first top wall being coupled to a top end of the first substantially rectangular-shaped wall, the first and second side walls of the first plastic frame member being coupled to first and second side ends, respectively, of the first substantially rectangular-shaped wall such that the first and second side walls of the first plastic frame member extend substantially parallel to one another; the first and second side walls of the first plastic frame member extending past a bottom end of the first substantially rectangular-shaped wall such that a first gap is defined between the bottom end of the first substantially rectangular-shaped wall and the first and second side walls of the first plastic frame member; and
   the first outer housing of the first pouch battery cell further having a second major surface disposed between the first and second end portions thereof; the second major surface of the first pouch battery cell being disposed directly against the first substantially rectangular-shaped wall of the first plastic frame member, and the thermal interface member being disposed within the first gap of the first plastic frame member.

12. The battery system of claim 11, wherein the battery module further includes a second plastic frame member having a second substantially rectangular-shaped wall, a second top wall, and first and second side walls, the second top wall being coupled to a top end of the second substantially rectangular-shaped wall, the first and second side walls of the second plastic frame member being coupled to first and second side ends, respectively, of the second substantially rectangular-shaped wall such that the first and second side walls of the second plastic frame member extend substantially parallel to one another; the first and second side walls of the second plastic frame member extending past a bottom end of the second substantially rectangular-shaped wall such that a second gap is defined between the bottom end of the second substantially rectangular-shaped wall and the first and second side walls of the second plastic frame member; and the second outer housing of the second pouch battery cell further having a second major surface disposed between the first and second end portions thereof; the second major surface of the second pouch battery cell being disposed directly against the second substantially rectangular-shaped wall of the second plastic frame member, and the thermal interface member being disposed within the second gap of the second plastic frame member.

13. A battery system, comprising:
a thermal interface member disposed on a surface of a thermally conductive base member, the thermal interface member having first and second arcuate-shaped surfaces and a first groove, the first groove being disposed between the first and second arcuate-shaped surfaces and extending into the thermal interface member;
a battery module having a first pouch battery cell with a first outer housing, the first outer housing of the first pouch battery cell having a first end portion with a first extension portion and first and second arcuate-shaped end surfaces; and
the first pouch battery cell being disposed directly on the thermal interface member such that the first extension portion of the first pouch battery cell is disposed in the first groove of the thermal interface member, and the first extension portion of the first outer housing directly contacts the thermal interface member, and the first and second arcuate-shaped end surfaces of the first pouch battery cell are disposed directly on the first and second arcuate-shaped surfaces, respectively, of the thermal interface member.

14. The battery system of claim 13, wherein the thermal interface member comprises a pre-formed thermally conductive foam.

15. The battery system of claim 14, wherein the pre-formed thermally conductive foam is a molded thermally conductive polyurethane open-cell foam.

16. The battery system of claim 14, wherein the pre-formed thermally conductive foam is a die-cut thermally conductive polyurethane open-cell foam.

17. The battery system of claim 13, wherein the thermal interface member comprises a thermally conductive gel.

18. The battery system of claim 17, wherein the thermally conductive gel is a thermally conductive silicon-based gel.

19. The battery system of claim 13, wherein the thermal interface member has a thermal conductivity in a range of 1.5-3.0 Watts per meter-Kelvin.

20. The battery system of claim 13, wherein the thermal interface member further having third and fourth arcuate-shaped surfaces and a second groove, the second groove being disposed between the third and fourth arcuate-shaped surfaces and extending into the thermal interface member; the first pouch battery cell having a first major surface disposed between the first end portion and a second end portion thereof, the battery module further comprising:
a second pouch battery cell having a second outer housing with a first end portion, a second end portion, and a first major surface disposed between the first and second end portions thereof; the first major surface of the second pouch battery cell being directly against the first major surface of the first pouch battery cell; the first end portion of the second outer housing having a first extension portion and first and second arcuate-shaped end surfaces; and
the second pouch battery cell being disposed directly on the thermal interface member such that the first extension portion of the second pouch battery cell is disposed in the second groove of the thermal interface member, and the first extension portion of the second outer housing directly contacts the thermal interface member, and the first and second arcuate-shaped end surfaces of the second pouch battery cell being disposed directly on the third and fourth arcuate-shaped surfaces, respectively, of the thermal interface member.

* * * * *